(12) United States Patent
Zheng et al.

(10) Patent No.: US 12,316,019 B2
(45) Date of Patent: May 27, 2025

(54) COMMUNICATION APPARATUS AND SYSTEM

(71) Applicant: HUAWEI TECHNOLOGIES CO., LTD., Shenzhen (CN)

(72) Inventors: Jiayu Zheng, Hangzhou (CN); Ming Zhang, Hangzhou (CN); Bin Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 169 days.

(21) Appl. No.: 18/180,881

(22) Filed: Mar. 9, 2023

(65) Prior Publication Data
US 2023/0223685 A1 Jul. 13, 2023

Related U.S. Application Data

(63) Continuation of application No. PCT/CN2021/113649, filed on Aug. 19, 2021.

(30) Foreign Application Priority Data

Sep. 14, 2020 (CN) .......................... 202010959909.5

(51) Int. Cl.
H01Q 3/34 (2006.01)
H01P 1/213 (2006.01)
(Continued)

(52) U.S. Cl.
CPC ............... H01Q 3/34 (2013.01); H01P 1/213 (2013.01); H01P 5/12 (2013.01); H04B 7/0408 (2013.01); H04B 7/0617 (2013.01)

(58) Field of Classification Search
CPC . H01Q 3/34; H01Q 3/40; H01Q 21/00; H01P 1/213; H01P 5/12; H01P 1/18; H04B 7/0408; H04B 7/0617; H04B 7/086
See application file for complete search history.

(56) References Cited

U.S. PATENT DOCUMENTS 9,941,587 B2 * 4/2018 Wu ........................ H01Q 3/40
9,972,893 B2 * 5/2018 Patel ..................... H01Q 21/28
(Continued)

FOREIGN PATENT DOCUMENTS

CN 103682682 B 8/2016
CN 106229685 A 12/2016
(Continued)

OTHER PUBLICATIONS

India Office Action issued in corresponding India Application No. 202327015657, dated Aug. 2, 2023, pp. 1-6.
(Continued)

Primary Examiner — Seung H Lee
(74) Attorney, Agent, or Firm — HAUPTMAN HAM, LLP

(57) ABSTRACT

A communication apparatus includes a phase shifter, an input port, and an output port. The phase shifter includes a first structure that includes a first phase difference coupler, a second phase difference coupler, a first, second, third, fourth, a fifth and a sixth phase shifter, a cross coupler, a first combiner, and a second combiner. The first phase difference coupler is coupled to the third and fourth phase shifter, and is further coupled to the cross coupler and the first combiner. The second phase difference coupler is coupled to the fifth and sixth phase shifter, and is further coupled to the second phase shifter and the second combiner. A second output port of the first phase difference coupler is coupled to a first input port of the cross coupler. A first output port of the second phase difference coupler is coupled to an input port of the second phase shifter.

12 Claims, 24 Drawing Sheets

(51) Int. Cl.
*H01P 5/12* (2006.01)
*H04B 7/0408* (2017.01)
*H04B 7/06* (2006.01)

(56) References Cited

U.S. PATENT DOCUMENTS

| | | | |
|---|---|---|---|
| 10,110,404 B2* | 10/2018 | Ma | H04L 27/20 |
| 11,082,186 B2* | 8/2021 | Gwinn, IV | H01Q 21/293 |
| 11,757,182 B2* | 9/2023 | Cercelaru | H01P 1/184 |
| | | | 343/893 |
| 2017/0117629 A1 | 4/2017 | Thorebäck | |

FOREIGN PATENT DOCUMENTS

| | | |
|---|---|---|
| JP | 2006526293 A | 11/2006 |
| KR | 101809383 B1 | 12/2017 |
| WO | 2010120760 A2 | 10/2010 |
| WO | 2018164066 A1 | 9/2018 |
| WO | 2019065158 A1 | 4/2019 |
| WO | 2019201142 A1 | 10/2019 |

OTHER PUBLICATIONS

Japanese Office Action issued in corresponding Japanese Application No. 2023-516561, dated May 28, 2024, pp. 1-6.

Patterson C E, Khan W T, Ponchak G E, et al. A 60-GHz active receiving switched-beam antenna array with integrated butler matrix and GaAs amplifiers. IEEE transactions on microwave theory and techniques, vol. 60, Issue: 11, Nov. 2012, pp. 3599-3607.

Kim Y J, Kim Y B, Dong H J, et al. Compact Switched-Beam Array Antenna with a Butler Matrix and a Folded Ground Structure. Electronics, Dec. 18, 2019, total 12 pages.

Chang C C, Lee R H, Shih T Y. Design of a beam switching/steering Butler matrix for phased array system. IEEE Transactions on Antennas and Propagation, vol. 58, Issue: 2, Feb. 2010, pp. 367-374.

\* cited by examiner

COMMUNICATION APPARATUS AND SYSTEM

CROSS-REFERENCE TO RELATED APPLICATIONS

This application is a continuation of International Application No. PCT/CN2021/113649, filed on Aug. 19, 2021, which claims priority to Chinese Patent Application No. 202010959909.5, filed on Sep. 14, 2020, the disclosures of the aforementioned applications are hereby incorporated by reference in their entireties.

TECHNICAL FIELD

Embodiments of this application relate to the field of communication technologies, and in particular, to a communication apparatus and system.

BACKGROUND

In ground base station communication and satellite communication, selective transmission and reception are performed by using a plurality of beams, to reduce interference to a neighboring cell and interference from the neighboring cell. In addition, the plurality of beams help implement spatial division multiplexing, and improve a capacity of a communication system.

At present, the plurality of beams may be implemented through digital beamforming, analog beamforming, and hybrid beamforming. When the plurality of beams are formed through digital beamforming, a direction of each beam may be independently and flexibly adjusted. However, a quantity of radio frequency links required by digital beamforming is equal to a quantity of antennas in an antenna array; and when a scale of the antenna array is expanded, a quantity of required analog-to-digital converters and a quantity of required digital-to-analog converters are also large, which results in high power consumption. When the plurality of beams are formed through analog beamforming, no analog-to-digital converter or digital-to-analog converter is required, and power consumption is greatly reduced. However, the beam formed through analog beamforming cannot be flexibly adjusted and controlled. A plurality of beams that can be flexibly adjusted and controlled are formed through hybrid beamforming by using a fully connected structure. However, a large quantity of phase shifters are required in this manner for implementation. For example, if T beams are generated simultaneously by using a two-dimensional array including N×M antenna arrays, T×N×M phase shifters are required. It can be learned that the plurality of beams formed through existing beamforming cannot meet a service requirement, and a feed network is urgently required, to form a plurality of beams that can be flexibly adjusted and controlled and reduce a quantity of phase shifters as much as possible under a condition of low power consumption.

SUMMARY

One or more embodiments of the present application provide a communication apparatus and system, to reduce a quantity of phase shifters, flexibly adjust and control a plurality of beams, and implement independent scanning by each beam.

It should be noted that coupling mentioned in this application may be understood as a direct connection between two components, or may be understood as an indirect connection between two components. For example, a first phase shifter is coupled to a first combiner. The direct connection may be understood as a direct connection between the first phase shifter and the first combiner. The indirect connection may be understood as a connection between the first phase shifter and the first combiner after any quantity of phase shifters are connected, or may be further understood as a connection between the first phase shifter and the first combiner by using a resistor.

According to a first aspect, at least an embodiment of this application provides a communication apparatus. The communication apparatus includes a phase shift unit, an input port, and an output port. The phase shift unit includes at least one first structure. The first structure includes a first phase difference coupler, a second phase difference coupler, a first phase shifter, a second phase shifter, a third phase shifter, a fourth phase shifter, a fifth phase shifter, a sixth phase shifter, a cross coupler, a first combiner, and a second combiner. The first phase difference coupler is coupled to the third phase shifter and the fourth phase shifter, and is coupled to the cross coupler and the first combiner. The second phase difference coupler is coupled to the fifth phase shifter and the sixth phase shifter, and is coupled to the second phase shifter and the second combiner. A second output port of the first phase difference coupler is coupled to a first input port of the cross coupler, a first output port of the second phase difference coupler is coupled to an input port of the second phase shifter, and an output port of the second phase shifter is coupled to a second input port of the cross coupler. The input port is coupled to an input port of the third phase shifter, an input port of the fourth phase shifter, an input port of the fifth phase shifter, and an input port the sixth phase shifter. The output port is coupled to an output port of the first phase shifter and an output port of the second combiner.

According to embodiments of this application, when beamforming is performed by using the communication apparatus, because the phase difference couplers are introduced to reduce a quantity of phase shifters required during beamforming, and signals in different channels may share the first phase shifter and the second phase shifter, the quantity of the phase shifters is reduced, device overheads during beamforming are reduced, and power consumption of the device is reduced in a case of phase shifter multiplexing. In addition, phase difference values of the phase difference couplers and phase shift values of the phase shifters are adjusted, so that a plurality of beams can be flexibly adjusted and controlled, and independent scanning by each beam can be implemented.

In some embodiments, the phase shift unit further includes a second structure. The second structure includes a third phase difference coupler, a seventh phase shifter, an eighth phase shifter, and a ninth phase shifter. The third phase difference coupler is coupled to the eighth phase shifter and the ninth phase shifter, and is coupled to the seventh phase shifter. The input port is coupled to an input port of the eighth phase shifter and an input port of the ninth phase shifter. The output port is coupled to an output port of the seventh phase shifter.

In this way, when the phase shift unit performs beamforming by using the second structure, a quantity of phase shifters may also be reduced, a plurality of beams can be flexibly adjusted and controlled, and independent scanning by each beam can be implemented. In addition, in actual application, the first structure and the second structure may be combined to implement beamforming, to adjust more beams flexibly by using the communication apparatus.

In some embodiments, the phase shift unit further includes a third structure. The third structure includes a power splitter, a tenth phase shifter, and an eleventh phase shifter. The power splitter is coupled to the tenth phase shifter and the eleventh phase shifter. The input port is coupled to an input port of the eleventh phase shifter. The output port is coupled to an output port of the tenth phase shifter.

In this way, in actual application of the phase shift unit, beamforming may be implemented by combining the first structure and the third structure, to adjust more beams flexibly by using the communication apparatus.

In some embodiments, the input port of the apparatus is coupled to the power splitter. The input port of the communication apparatus is coupled to the power splitter, to divide a signal from a radio frequency unit into multi-channel signals and input the multi-channel signals to the communication apparatus.

In some embodiments, the apparatus further includes a third combiner and a fourth combiner. When the phase shift unit includes a plurality of first structures, the third combiner may combine signals from output ports of first phase shifters in the first structures, and the fourth combiner may combine signals from output ports of second combiners in the first structures. When the phase shift unit includes at least one first structure and one second structure, the third combiner may combine a signal from an output port of a first phase shifter in the first structure and a signal from an output port of a seventh phase shifter in the second structure, and the fourth combiner may combine a signal from an output port of a second combiner in the first structure and a signal from a second output port of a third phase difference coupler in the second structure. When the phase shift unit includes at least one first structure and one third structure, the third combiner may combine a signal from an output port of a first phase shifter in the first structure and a signal from an output port of a tenth phase shifter in the third structure, and the fourth combiner may combine a signal from an output port of a second combiner in the first structure and a signal from a second output port of a power splitter in the third structure.

It should be noted that, in the communication apparatus including the third combiner and the fourth combiner, input of multi-channel signals and output of two-channel signals may be implemented.

In some embodiments, the apparatus further includes a fifth combiner, a sixth combiner, a seventh combiner, an eighth combiner, a fourth phase difference coupler, and a fifth phase difference coupler. When the phase shift unit includes a plurality of first structures, and the first structures are arranged in sequence in the phase shift unit, the fifth combiner may combine signals from output ports of first phase shifters in odd-numbered first structures, and an output port of the fifth combiner is coupled to a first input port of the fourth phase difference coupler; the sixth combiner may combine signals from output ports of second combiners in odd-numbered first structures, and an output port of the sixth combiner is coupled to a first input port of the fifth phase difference coupler; the seventh combiner may combine signals from output ports of first phase shifters in even-numbered first structures, and an output port of the seventh combiner is coupled to a second input port of the fourth phase difference coupler; and the eighth combiner may combine signals from output ports of second combiners in even-numbered first structures, and an output port of the eighth combiner is coupled to a second input port of the fifth phase difference coupler.

When the phase shift unit includes a plurality of first structures and one second structure, the fifth combiner may combine a signal from an output port of a first phase shifter in an odd-numbered first structure and a signal from an output port of a seventh phase shifter in the second structure, and the output port of the fifth combiner is coupled to the first input port of the fourth phase difference coupler; the sixth combiner may combine a signal from an output port of a second combiner in an odd-numbered first structure and a signal from the second output port of a third phase difference coupler in the second structure, and the output port of the sixth combiner is coupled to the first input port of the fifth phase difference coupler; the seventh combiner may combine signals from output ports of first phase shifters in even-numbered first structures, and the output port of the seventh combiner is coupled to the second input port of the fourth phase difference coupler; and the eighth combiner may combine signals from output ports of second combiners in even-numbered first structures, and the output port of the eighth combiner is coupled to the second input port of the fifth phase difference coupler.

When the phase shift unit includes a plurality of first structures and one third structure, the fifth combiner may combine a signal from an output port of a first phase shifter in an odd-numbered first structure and a signal from an output port of a tenth phase shifter in the third structure, and the output port of the fifth combiner is coupled to the first input port of the fourth phase difference coupler; the sixth combiner may combine a signal from an output port of a second combiner in an odd-numbered first structure and a signal from a second output port of a power splitter in the third structure, and the output port of the sixth combiner is coupled to the first input port of the fifth phase difference coupler; the seventh combiner may combine signals from output ports of first phase shifters in even-numbered first structures, and the output port of the seventh combiner is coupled to the second input port of the fourth phase difference coupler; and the eighth combiner may combine signals from output ports of second combiners in even-numbered first structures, and the output port of the eighth combiner is coupled to the second input port of the fifth phase difference coupler.

It should be noted that, if the phase shift unit includes a plurality of first structures that are arranged in sequence, for example, 10 first structures, the foregoing odd-numbered first structure may be understood as a first first structure, a third first structure, a fifth first structure, a seventh first structure, or a ninth first structure, and the foregoing even-numbered first structure may be understood as a second first structure, a fourth first structure, a sixth first structure, an eighth first structure, or a tenth first structure.

In addition, in actual application, when the fifth combiner, the sixth combiner, the seventh combiner, and the eighth combiner combine signals in the phase shift unit, a signal combination manner is not limited to the foregoing signal combination manners. Another signal combination manner may be further included. This is not specifically limited herein in this application. For example, when the phase shift unit includes 2n first structures, the fifth combiner may combine signals from output ports of first phase shifters of a first first structure to an $n^{th}$ first structure, the sixth combiner may combine signals from output ports of second combiners of the first first structure to the $n^{th}$ first structure, the seventh combiner may combine signals from output ports of first phase shifters of an $n+1^{th}$ first structure to a $2n^{th}$ first structure, and the eighth combiner may combine signals from output ports of second combiners of the $n+1^{th}$ first structure to the $2n^{th}$ first structure. n is an integer, and n is greater than or equal to 0. Any manner in which output signals of the phase shift unit are combined by using the fifth combiner, the sixth combiner, the seventh combiner, and the eighth combiner is applicable to this application.

It should be noted that, in the communication apparatus including the fourth phase difference coupler and the fifth phase difference coupler, input of multi-channel signals and output of four-channel signals may be implemented.

In some embodiments, the communication apparatus further includes a controller. The controller is configured to adjust a parameter of the phase shift unit. The parameter includes at least one of the following: a parameter of the first phase difference coupler, a parameter of the second phase difference coupler, a parameter of the third phase difference coupler, a parameter of the first phase shifter, a parameter of the second phase shifter, a parameter of the third phase shifter, a parameter of the fourth phase shifter, a parameter of the fifth phase shifter, a parameter of the sixth phase shifter, a parameter of the seventh phase shifter, a parameter of the eighth phase shifter, a parameter of the ninth phase shifter, a parameter of the tenth phase shifter, and a parameter of the eleventh phase shifter.

It should be noted that, the controller may adjust the phase difference values of the phase difference couplers and the phase shift values of the phase shifters in the phase shift unit. Therefore, beams having different directions are determined by using the communication apparatus.

According to a second aspect, at least an embodiment of this application further provides a communication system, including a plurality of antenna arrays and the communication apparatus according to the first aspect. The antenna array is connected to an output port of the communication apparatus, and the antenna array is configured to output beams having different directions.

In some embodiments, the communication system further includes a radio frequency unit. The radio frequency unit is connected to an input port of the communication apparatus, and the radio frequency unit is configured to input a signal to the communication apparatus.

According to a third aspect, at least an embodiment of this application provides a control method. The method may be applied to the communication system according to the second aspect. The method includes: A radio frequency unit receives a radio frequency signal; and sends the radio frequency signal to a communication apparatus, to enable an antenna array to output beams having different directions.

In addition, it should be further noted that, phase difference values of phase difference couplers and phase shift values of phase shifters in the communication apparatus may be determined by a controller after directions of required beams are determined.

According to a fourth aspect, at least an embodiment of this application provides a system. The system may be an electronic device.

For technical effect of corresponding solutions from the second aspect to the fourth aspect, refer to technical effect that may be obtained according to a corresponding solution in the first aspect. Repeated parts are not described in detail.

These aspects or other aspects of this application are more concise and easier to understand in descriptions of the following embodiments.

BRIEF DESCRIPTION OF DRAWINGS

FIG. 10a-1 and FIG. 10a-2 are a schematic diagram of a structure of a communication apparatus according to at least an embodiment of this application;

FIG. 10b-1 and FIG. 10b-2 are a schematic diagram of another structure of a communication apparatus according to at least an embodiment of this application;

FIG. 10c-1 and FIG. 10c-2 are a schematic diagram of another structure of a communication apparatus according to at least an embodiment of this application;

DESCRIPTION OF EMBODIMENTS

To make objectives, technical solutions, and advantages of this application clearer, the following describes technical solutions in embodiments of this application in detail with reference to accompanying drawings in embodiments of this application.

In a scenario of high-rate communication such as base station communication or satellite communication, a scale of an antenna array is increasingly large. Power consumption of an ultra-large-scale antenna array cannot be ignored. A plurality of beams whose directions are adjustable are implemented through analog beamforming with low power consumption, and reducing a quantity of phase shifters with a fully connected architecture becomes a problem that needs to be resolved urgently at present. Based on this, this application provides a communication apparatus to reduce a quantity of phase shifters required during beamforming, and implement a plurality of beams whose directions can be flexibly adjusted and controlled.

It should be noted that in description of embodiments of this application, "at least one" refers to one or more, and "a plurality of" refers to two or more. In view of this, in embodiments of the present disclosure, "a plurality of" may also be understood as "at least two". A term "and/or" describes an association relationship between associated objects and indicates that three relationships may exist. For example, A and/or B may indicate the following three cases: Only A exists, both A and B exist, and only B exists. In addition, a character "/" generally indicates an "or" relationship between the associated objects unless otherwise specified. In addition, it should be understood that in the description of this application, terms such as "first" and "second" are merely used for distinguishing and description, but should not be understood as indicating or implying relative importance, or should not be understood as indicating or implying a sequence.

It should be noted that, in embodiments of this application, "coupling" means an electrical connection, and a connection between two electrical elements may be a direct or indirect connection between the two electrical elements. For example, a connection between A and B may represent that A and B are directly connected to each other, or A and B are indirectly connected to each other by using one or more other electrical elements. For example, the connection between A and B may also represent that A is directly connected to C, C is directly connected to B, and A and B are connected to each other through C.

Figure 1:
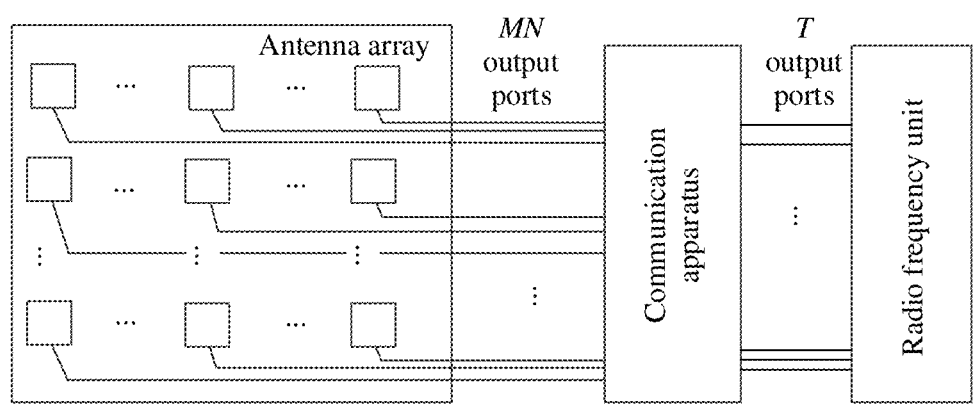
FIG. 1 is a schematic diagram of a structure of a communication system according to at least an embodiment of this application.

FIG. 1 is a schematic diagram of a communication system to which at least an embodiment of this application is applicable. The communication system includes a radio frequency unit, a communication apparatus, and an antenna array. The antenna array is connected to output ports of the communication apparatus. The radio frequency unit is connected to input ports of the communication apparatus. The antenna array is configured to output beams having different directions. The radio frequency unit is configured to input a signal to the communication apparatus. If the communication apparatus includes T input ports and MN output ports, a phase shift amount of a feed signal required for beamforming may be provided for each antenna unit in the antenna array. As shown in FIG. 1, T streams of radio frequency signals are input from the T input ports of the T-input-MN-output communication apparatus, and each stream of signals is output through the MN output ports of the communication apparatus. Phase distribution of the output signals may enable the antenna array connected to the communication apparatus to radiate a beam in a specific direction.

In the communication system in this application, a maximum quantity of beams that can be simultaneously generated is equal to a quantity of input ports of the communication apparatus. In addition, a direction of each beam may be changed independently and flexibly by adjusting a phase difference value of a phase difference coupler and a phase shift value of a phase shifter in the communication apparatus.

Figure 2:
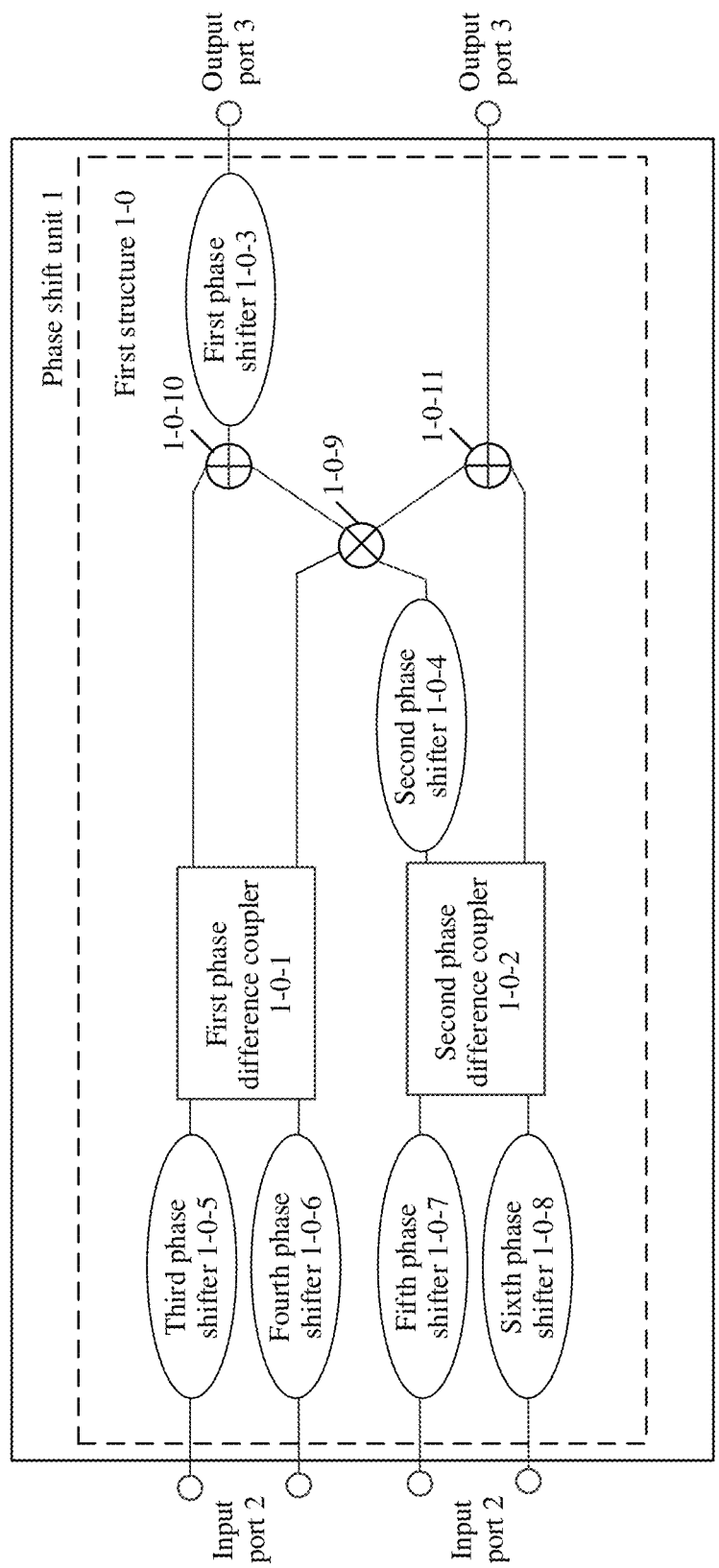
FIG. 2 is a schematic diagram of a structure of a communication apparatus according to at least an embodiment of this application.

Next, a structure of the communication apparatus in this application may be described with reference to the accompanying drawings. As shown in FIG. 2, the communication apparatus includes a phase shift unit 1, input ports 2, and output ports 3. The phase shift unit 1 includes at least one first structure 1-0. The first structure 1-0 includes a first phase difference coupler 1-0-1, a second phase difference coupler 1-0-2, a first phase shifter 1-0-3, a second phase shifter 1-0-4, a third phase shifter 1-0-5, a fourth phase shifter 1-0-6, a fifth phase shifter 1-0-7, a sixth phase shifter 1-0-8, a cross coupler 1-0-9, a first combiner 1-0-10, and a second combiner 1-0-11.

The first phase difference coupler 1-0-1 is coupled to the third phase shifter 1-0-5 and the fourth phase shifter 1-0-6, and is coupled to the cross coupler 1-0-9 and the first combiner 1-0-10. The second phase difference coupler 1-0-2 is coupled to the fifth phase shifter 1-0-7 and the sixth phase shifter 1-0-8, and is coupled to the second phase shifter 1-0-4 and the second combiner 1-0-11. A second output port of the first phase difference coupler 1-0-1 is coupled to a first input port of the cross coupler 1-0-9. A first output port of the second phase difference coupler 1-0-2 is coupled to an input port of the second phase shifter 1-0-4. An output port of the second phase shifter 1-0-4 is coupled to a second input port of the cross coupler 1-0-9. The input ports 2 are coupled to an input port of the third phase shifter 1-0-5, an input port of the fourth phase shifter 1-0-6, an input port of the fifth phase shifter 1-0-7, and an input port of the sixth phase shifter 1-0-8 respectively. The output ports 3 are coupled to an output port of the first phase shifter 1-0-3 and an output port of the second combiner 1-0-11 respectively.

It should be noted that when signals are input at different input ports of the phase difference coupler, and phase differences between output signals at output ports of the phase difference coupler are different. For example, for a phase difference coupler with a phase difference of $x_1$ between an upper output port and a lower output port, when a signal is input from an upper input port of the phase difference coupler, the upper output port and the lower output port of the phase difference coupler output signals with an equal signal amplitude and a phase difference of $x_1$. When a signal is input from a lower input port of the phase difference coupler, the upper output port and the lower output port of the phase difference coupler output signals with an equal signal amplitude and a phase difference of $-x_1$.

In addition, in the first structure 1-0 shown in FIG. 2, the third phase shifter 1-0-5, the fourth phase shifter 1-0-6, the fifth phase shifter 1-0-7, and the sixth phase shifter 1-0-8 may be coupled to the input ports of the communication apparatus. However, in actual application, the first structure 1-0 may further not include the sixth phase shifter 1-0-8, and the third phase shifter 1-0-5, the fourth phase shifter 1-0-6, and the fifth phase shifter 1-0-7 in the first structure 1-0 are coupled to the input ports of the communication apparatus.

Figure 3:
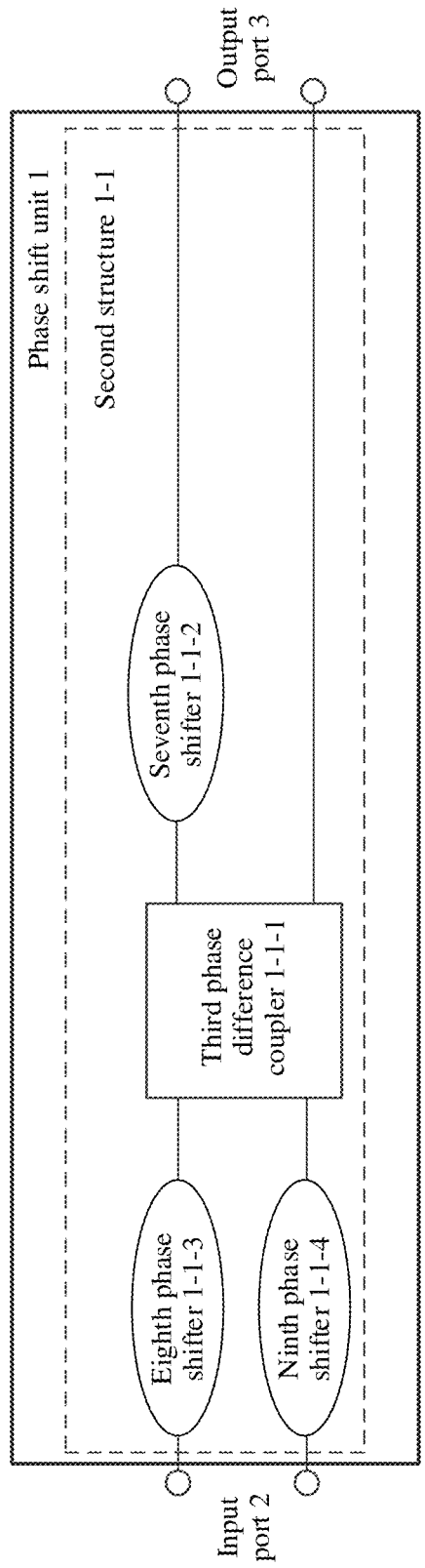
FIG. 3 is a schematic diagram of another structure of a communication apparatus according to at least an embodiment of this application.

For example, the phase shift unit 1 may further include a second structure 1-1, as shown in FIG. 3. The second structure 1-1 includes a third phase difference coupler 1-1-1, a seventh phase shifter 1-1-2, an eighth phase shifter 1-1-3, and a ninth phase shifter 1-1-4. The third phase difference coupler 1-1-1 is coupled to the eighth phase shifter 1-1-3 and the ninth phase shifter 1-1-4, and is coupled to the seventh phase shifter 1-1-2. The input ports 2 are coupled to an input port of the eighth phase shifter 1-1-3 and an input port of the ninth phase shifter 1-1-4. The output port 3 is coupled to an output port of the seventh phase shifter 1-1-2.

The following uses the second structure 1-1 as an example to briefly describe how to determine a phase difference value of the third phase difference coupler 1-1-1 and a phase shift value of the seventh phase shifter 1-1-2. Because there is a one-to-one correspondence between a phase difference between input signals of adjacent units of a radiation array and a direction of an array radiation beam, the output port of the seventh phase shifter 1-1-2 and an output port of the third phase difference coupler 1-1-1 in the second structure 1-1 are coupled to the signal output ports of the communication apparatus, a target direction required for a radiation beam may be used to determine a phase difference between an output signal from the output port of the third phase difference coupler 1-1-1 and an output signal from the output port of the seventh phase shifter 1-1-2 in the second structure 1-1.

To better describe the technical solutions of this application, it is assumed that phase differences, between adjacent units of a required array, determined based on directions of corresponding radiation beams are respectively $PD_{4n+1}$ and $PD_{4n+2}$, a phase shift value of the seventh phase shifter 1-1-2 is $PS_7$, a phase shift value of the eighth phase shifter 1-1-3 is $PS_8$, a phase shift value of the ninth phase shifter 1-1-4 is $PS_9$, and a phase difference value of the third phase difference coupler 1-1-1 is $x_3$. A signal from a radio frequency unit passes through the eighth phase shifter 1-1-3 with a phase shift of $-PS_8$. The signal is input to a first input port of the third phase difference coupler 1-1-1 and output from a first output port of the third phase difference coupler 1-1-1 without a phase change, namely, $-PS_8-0$. Then, an output signal passes through the seventh phase shifter 1-1-2 with a phase shift of $-PS_8-0-PS_7$. The signal from the radio frequency unit passes through the eighth phase shifter 1-1-3 with a phase shift of $-PS_8$. The signal is input to the first input port of the third phase difference coupler 1-1-1 and output from a second output port of the third phase difference coupler 1-1-1 with a phase change of $-x_3$. Therefore, the signal is changed to $-PS_8-x_3$. $-PS_8-x_3$ is subtracted from $-PS_8-0-PS_7$ to obtain $PD_{4n+1}$, that is, $-x_3+PS_7=PD_{4n+1}$. The signal from the radio frequency unit passes through the ninth phase shifter 1-1-4 with a phase shift of $-PS_9$. Because the signal is input to a second input port of the third phase difference coupler 1-1-1 and output from the first output port of the third phase difference coupler 1-1-1, with a phase change of $-x_3$, a phase shift is $-PS_9-x_3$. Then, an output signal passes through the seventh phase shifter 1-1-2, and the phase shift becomes $-PS_9-x_3-PS_7$. The signal from the radio frequency unit passes through the ninth phase shifter 1-1-4 with a phase shift of $-PS_9$. Because the signal is input to the second input port of the third phase difference coupler 1-1-1 and output from the second output port of the third phase difference coupler 1-1-1 without a phase change, the phase shift of the signal is still $-PS_9$. $-PS_9$ is subtracted from $-PS_9-x_3-PS_7$ to obtain $x_3+PS_7$, namely, $x_3+PS_7=PD_{4n+2}$. Values of $x_3$ and $PS_7$ are determined by performing calculation on $-x_3+PS_7=PD_{4n+1}$ and $x_3+PS_7=PD_{4n+2}$. Similarly, in the first structure 1-0, a phase difference value of the first phase difference coupler 1-0-1, a phase difference value of the second phase difference coupler 1-0-2, a phase shift value of the first phase shifter 1-0-3, and a phase shift value of the second phase shifter 1-0-4 may all be determined in a manner similar to the foregoing manner.

Figure 4:
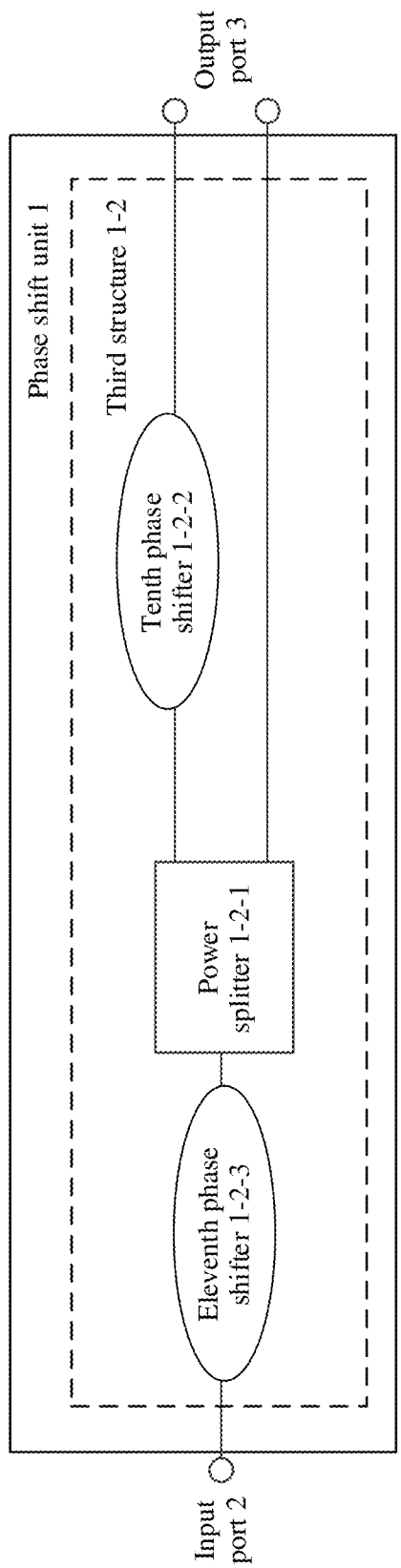
FIG. 4 is a schematic diagram of another structure of a communication apparatus according to at least an embodiment of this application.

For example, the phase shift unit 1 may further include a third structure 1-2, as shown in FIG. 4. The third structure 1-2 includes a power splitter 1-2-1, a tenth phase shifter 1-2-2, and an eleventh phase shifter 1-2-3. The power splitter 1-2-1 is coupled to the tenth phase shifter 1-2-2 and the eleventh phase shifter 1-2-3. The input port 2 is coupled to an input port of the eleventh phase shifter 1-2-3. The output port 3 is coupled to an output port of the tenth phase shifter 1-2-2.

The first structure 1-0 may be understood as a structure with four inputs and two outputs, or may be understood as a structure with three inputs and two outputs. The second structure 1-1 may be understood as a structure with two inputs and two outputs. The third structure 1-2 may be understood as a structure with one input and two outputs. In actual application, the communication apparatus may be constructed based on the first structure 1-0, the second structure 1-1, and the third structure 1-2. Therefore, a third combiner 5 and a fourth combiner 6 are further introduced in this application. Signals output by the first structure 1-0, the second structure 1-1, and the third structure 1-2 may be combined by using the third combiner 5 and the fourth combiner 6, as shown in FIG. 5*a* to FIG. 5*c*.

Figure 5A:
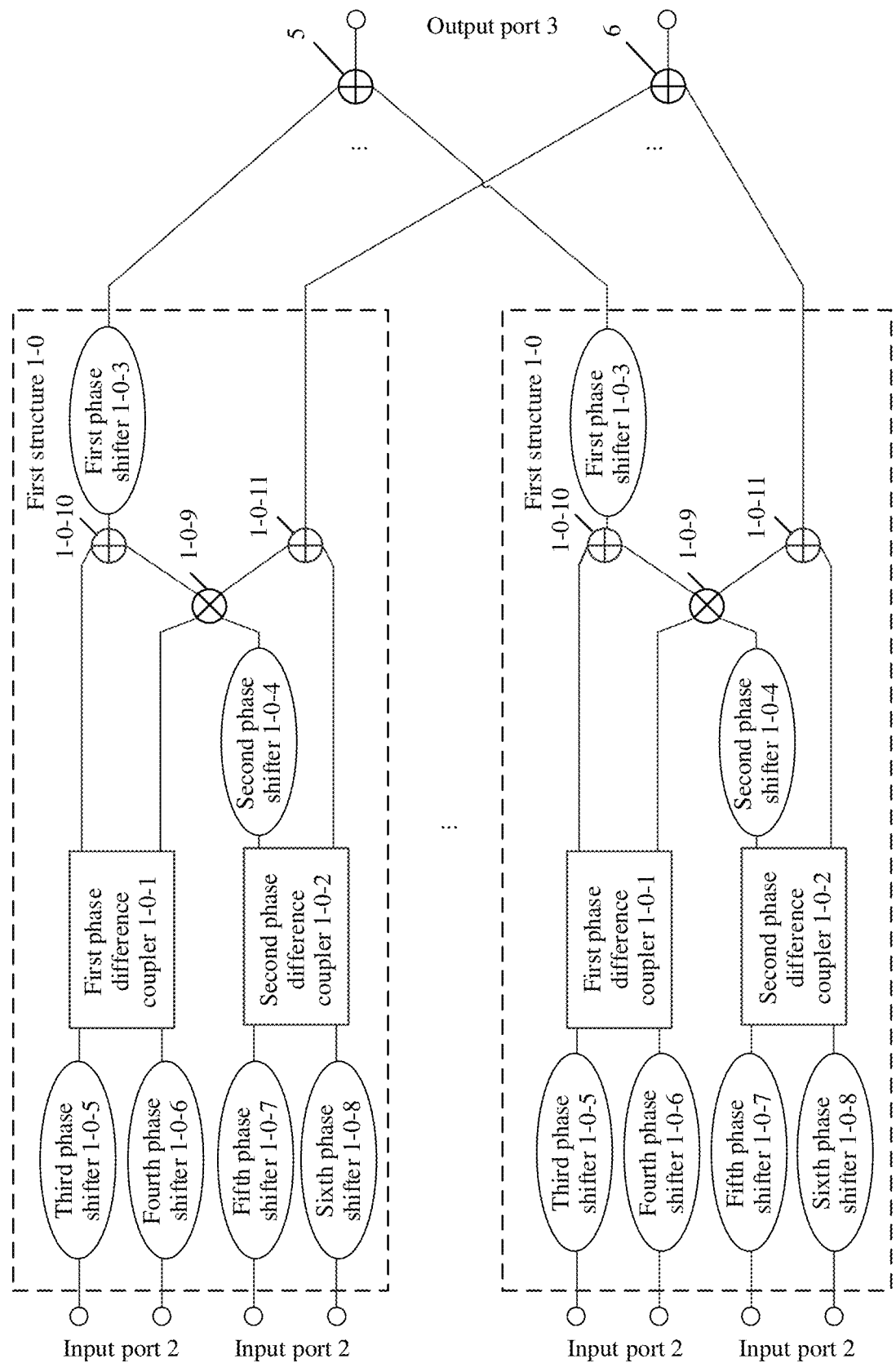
FIG. 5a is a schematic diagram of a structure of a communication apparatus according to at least an embodiment of this application.
Figure 5B:
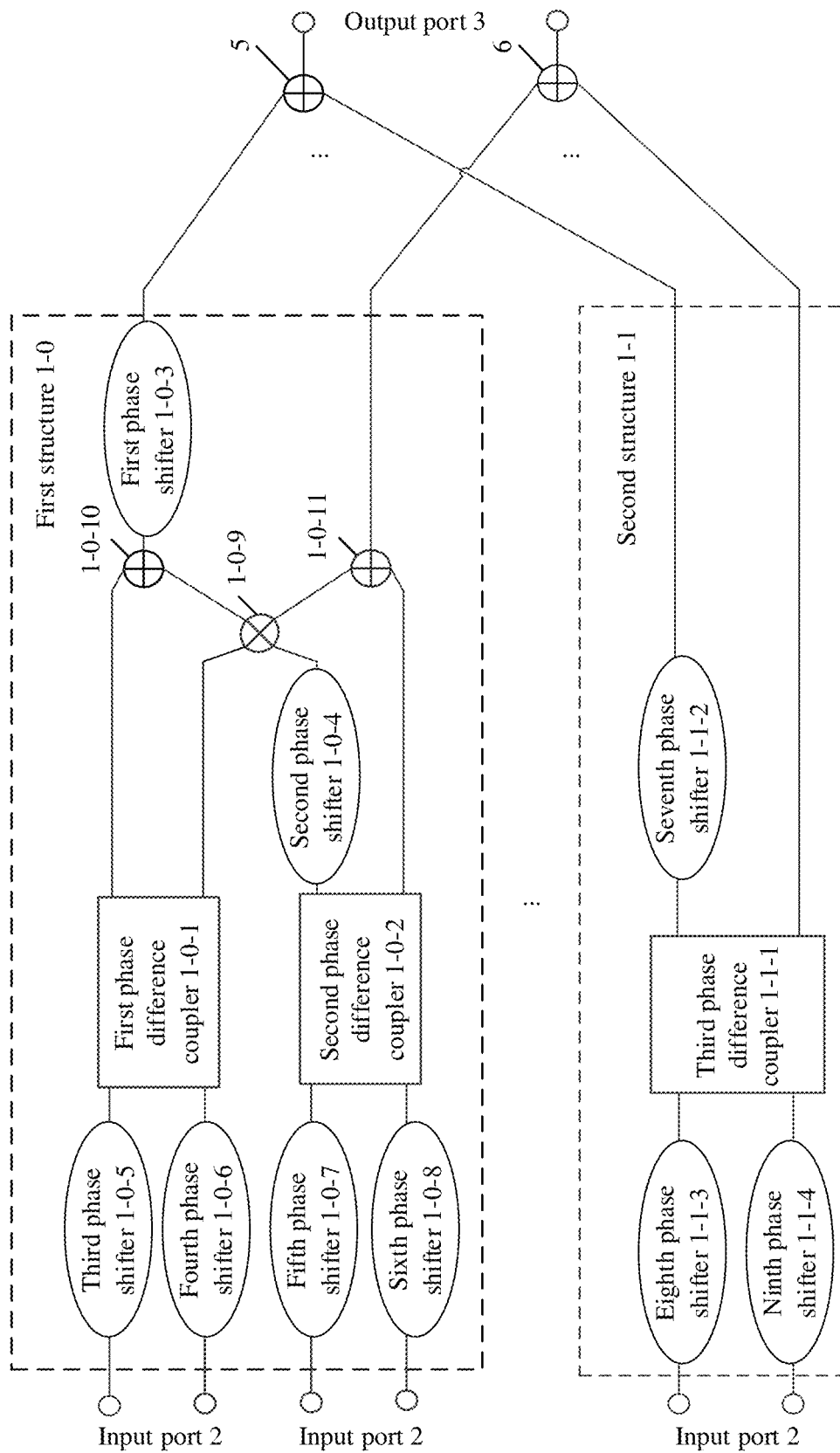
FIG. 5b is a schematic diagram of a structure of a communication apparatus according to at least an embodiment of this application.
Figure 5C:
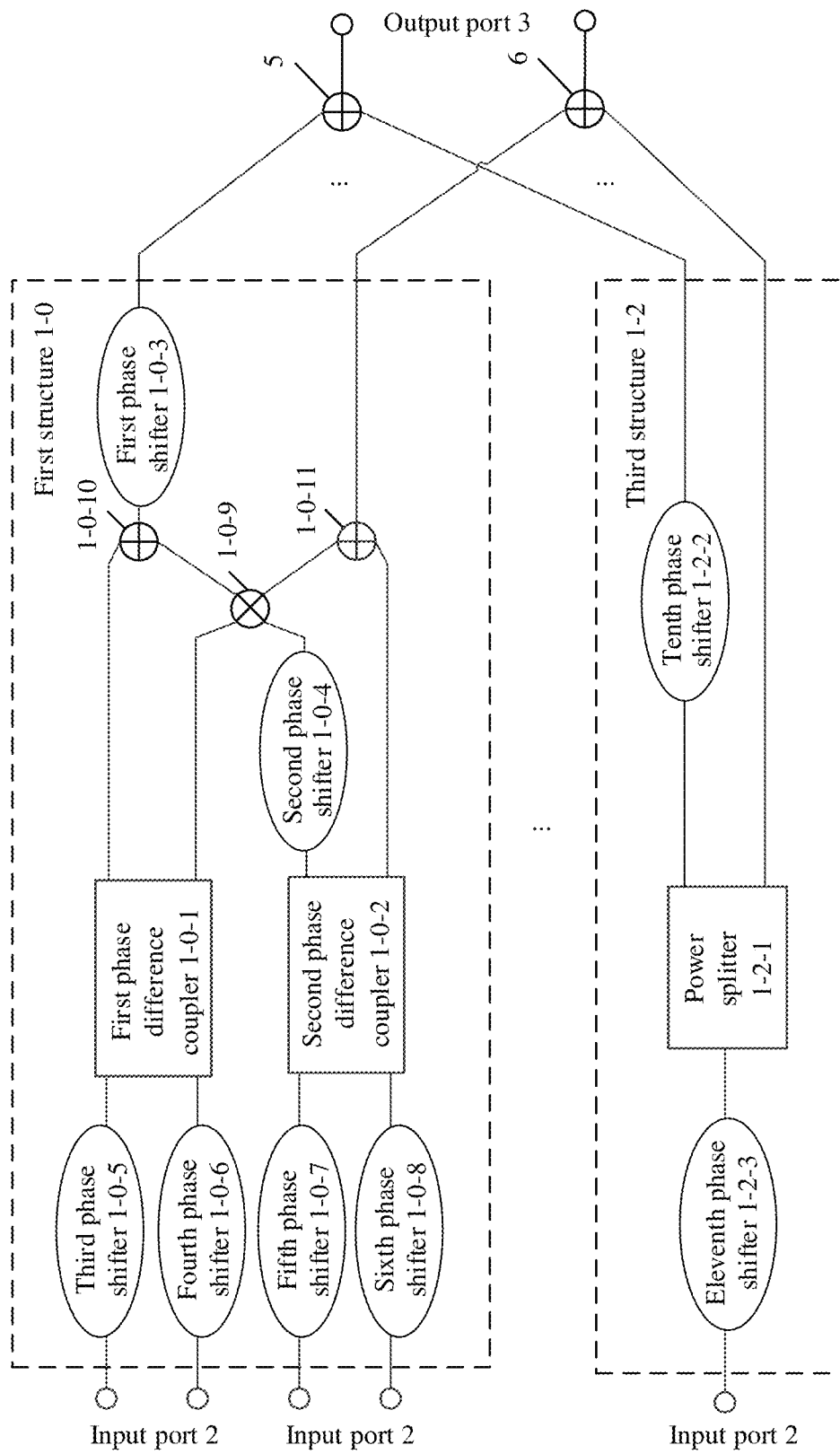
FIG. 5c is a schematic diagram of a structure of a communication apparatus according to at least an embodiment of this application.

It should be noted that, when the phase shift unit 1 includes a plurality of first structures 1-0, the third combiner 5 may combine signals from output ports of the first phase shifter 1-0-3 in the first structure 1-0, and the fourth combiner 6 may combine signals from output ports of the second combiner 1-0-11 in the first structure 1-0, as shown in FIG. 5*a*. When the phase shift unit 1 includes at least one first structure 1-0 and one second structure 1-1, the third combiner 5 may combine a signal from the output port of the first phase shifter 1-0-3 in the first structure 1-0 and a signal from an output port of the seventh phase shifter 1-1-2 in the second structure 1-1, and the fourth combiner 6 may combine a signal from the output port of the second combiner 1-0-11 in the first structure 1-0 and a signal from a second output port of the third phase difference coupler 1-1-1 in the second structure 1-1, as shown in FIG. 5*b*. When the phase shift unit 1 includes at least one first structure 1-0 and one third structure 1-2, the third combiner 5 may combine a signal from the output port of the first phase shifter 1-0-3 in the first structure 1-0 and a signal from an output port of the tenth phase shifter 1-2-2 in the third structure 1-2, and the fourth combiner 6 may combine a signal from the output port of the second combiner 1-0-11 in the first structure 1-0 and a signal from the power splitter 1-2-1 in the third structure 1-2, as shown in FIG. 5*c*.

In actual application, a quantity of first structures 1-0, a quantity of second structures 1-1, and a quantity of third structures 1-2 that are specifically selected to construct the communication apparatus may be determined by dividing a quantity of input ports by 4 (because the first structure 1-0 may be coupled to a maximum of four input ports, the quantity of the first structures 1-0, the quantity of the second structures 1-1, and the quantity of the third structures 1-2 that are required by the communication apparatus may be better determined by dividing the quantity of the input ports by 4). For example, if a quantity of input ports T is 17, and a quotient of dividing 17 by 4 is 4, with a remainder of 1, four first structures 1-0 (4 inputs and 2 outputs), one third structure 1-2, one third combiner 5, and one fourth combiner 6 may be selected to construct the communication apparatus. If the quantity of the input ports T is 18, and a quotient of dividing 18 by 4 is 4, with a remainder of 2, four first structures 1-0 (4 inputs and 2 outputs), one second structure, one third combiner 5, and one fourth combiner 6 may be selected to construct the communication apparatus. If the quantity of the input ports T is 19, and a quotient of dividing 19 by 4 is 4, with a remainder of 3, four first structures 1-0

(4 inputs and 2 outputs), one first structure 1-0 (3 inputs and 2 outputs), one third combiner 5, and one fourth combiner 6 may be selected to construct the communication apparatus. If the quantity of the input ports T is 20, and a quotient of dividing 20 by 4 is 5, five first structures 1-0 (4 inputs and 2 outputs), one third combiner 5, and one fourth combiner 6 may be selected to construct the communication apparatus.

Figure 6A:
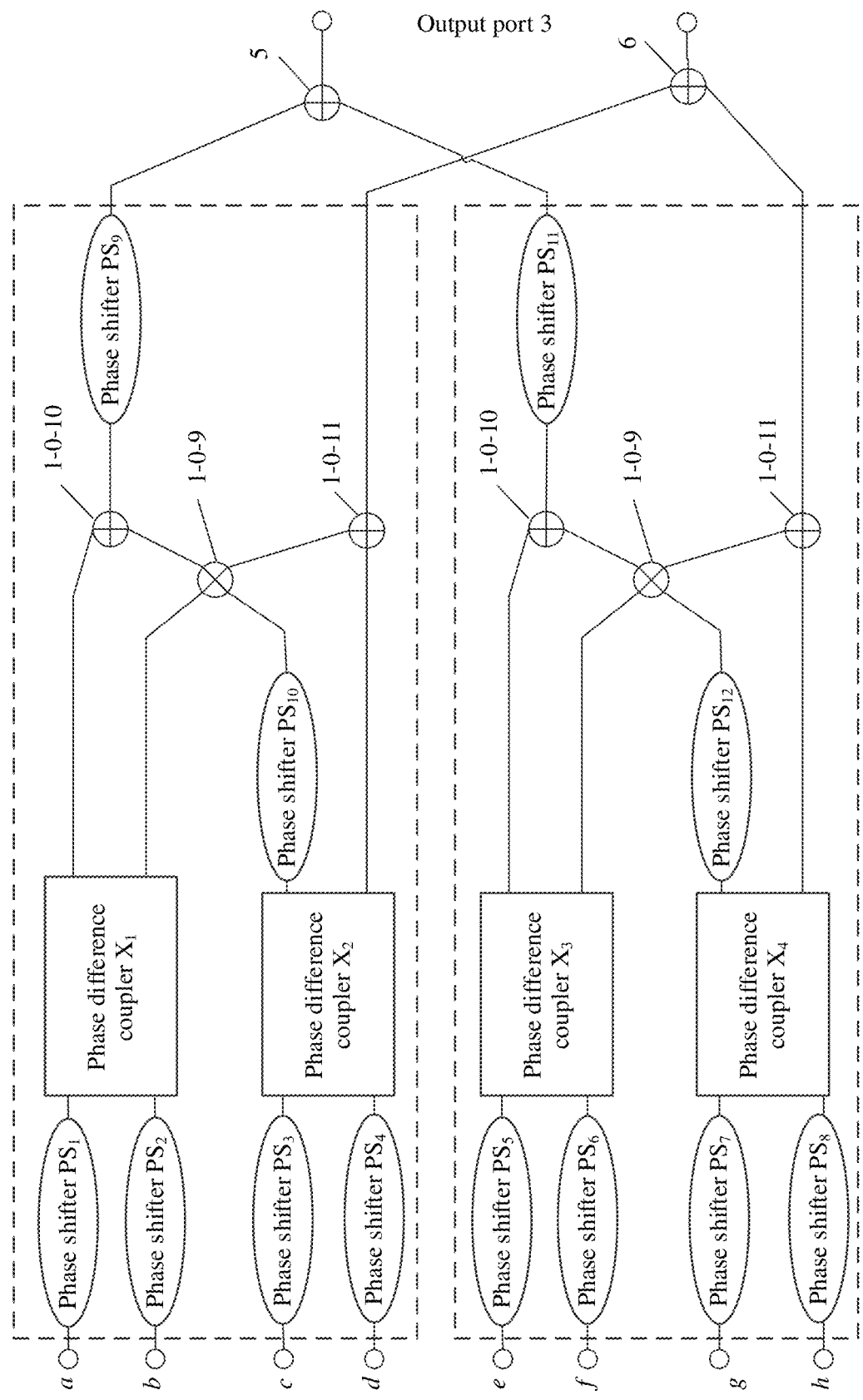
FIG. 6a is a schematic diagram of another structure of a communication apparatus according to at least an embodiment of this application.

For example, an 8-input 2-output unit consists of two first structures 1-0, as shown in FIG. 6a. In a first first structure 1-0, an input port a is coupled to a first input port of a phase difference coupler $X_1$ through a phase shifter $PS_1$. An input port b is coupled to a second input port of the phase difference coupler $X_1$ through a phase shifter $PS_2$. An input port c is coupled to a first input port of a phase difference coupler $X_2$ through a phase shifter $PS_3$. An input port d is coupled to a second input port of the phase difference coupler $X_2$ through a phase shifter $PS_4$. After a first output port of the phase difference coupler $X_1$ is coupled to a first input port of the first combiner 1-0-10, an output port of the first combiner 1-0-10 is coupled to a phase shifter $PS_9$. After a second output port of the phase difference coupler $X_1$ is coupled to a first input port of the cross coupler 1-0-9, a second output port of the cross coupler 1-0-9 is coupled to a first input port of the second combiner. A first output port of the phase difference coupler $X_2$ is coupled to an input port of a phase shifter $PS_{10}$. An output port of the phase shifter $PS_{10}$ is coupled to a second input port of the cross coupler 1-0-9. A second output port of the phase difference coupler $X_2$ is coupled to a second input port of the second combiner 1-0-11. A first output port of the cross coupler 1-0-9 is coupled to a second input port of the first combiner. In a second first structure 1-0, an input port e is coupled to a first input port of a phase difference coupler $X_3$ through a phase shifter $PS_5$. An input port f is coupled to a second input port of the phase difference coupler $X_3$ through a phase shifter $PS_6$. An input port g is coupled to a first input port of a phase difference coupler $X_4$ through a phase shifter $PS_7$. An input port h is coupled to a second input port of the phase difference coupler $X_4$ through a phase shifter $PS_5$. After a first output port of the phase difference coupler $X_3$ is coupled to the first input port of the first combiner 1-0-10, the output port of the first combiner 1-0-10 is coupled to a phase shifter $PS_{11}$. After a second output port of the phase difference coupler $X_3$ is coupled to the first input port of the cross coupler 1-0-9, the second output port of the cross coupler 1-0-9 is coupled to the first input port of the second combiner. A first output port of the phase difference coupler $X_4$ is coupled to an input port of a phase shifter $PS_{12}$. An output port of the phase shifter $PS_{12}$ is coupled to the second input port of the cross coupler 1-0-9. A second output port of the phase difference coupler $X_4$ is coupled to the second input port of the second combiner 1-0-11. The first output port of the cross coupler 1-0-9 is coupled to the second input port of the first combiner. An output port of the phase shifter $PS_9$ and an output port of the phase shifter $PS_{11}$ are connected to the third combiner 5. An output port of the second combiner 1-0-11 in the first structure 1-0 and an output port of the second combiner 1-0-11 in the second first structure 1-0 are connected to an output port of the fourth combiner 6.

Figure 6B:
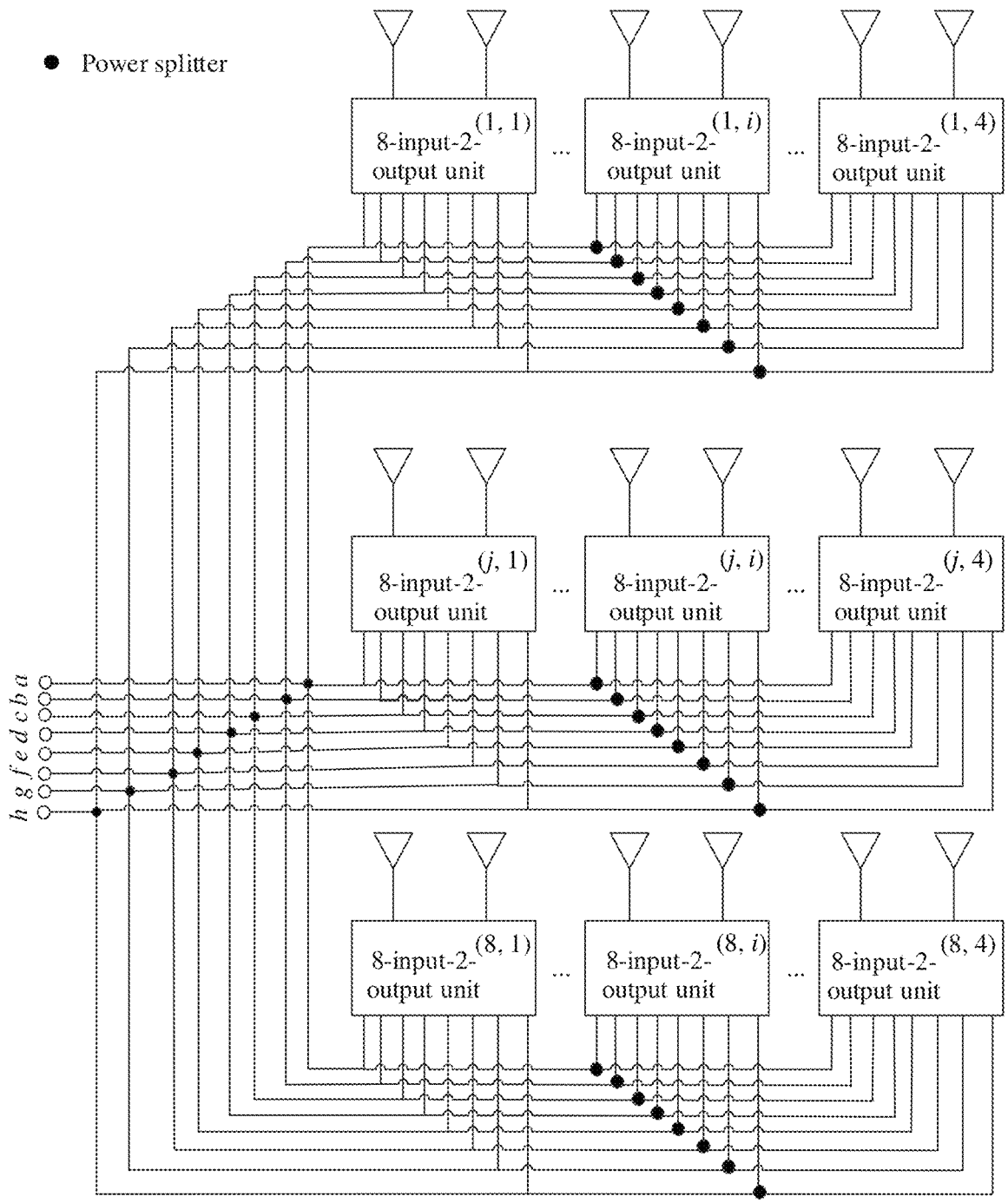
FIG. 6b is a schematic diagram of another structure of a communication apparatus according to at least an embodiment of this application.

In addition, input ports a-h of the communication apparatus may be further coupled to a power splitter, as shown in FIG. 6b, and output ports may be expanded in this manner. FIG. 6b shows an 8-input-64-output communication apparatus in which 8-channel input signals are divided into multi-channel signals by using a power splitter and the multi-channel signals are input to 32 8-input-2-output (con-structed by two first structures 1-0 (4-input-2-output)) units. In the 8-input-64-output communication apparatus shown in FIG. 6b, phase difference values of four phase difference couplers (two first phase difference couplers 1-0-1 and two second phase difference coupler 1-0-2) of each 8-input-2-output unit and phase shift values of phase shifters (two first phase shifters 1-0-3 and two second phase shifters 1-0-4) are the same respectively. Specific values are determined based on directions of required beams. Eight phase shifters coupled to input ports of phase difference couplers in the 8-input-2-output unit shown in FIG. 6b may be configured to adjust initial phases corresponding to eight beams corresponding to different 8-input-2-output units. FIG. 6b shows a unit arrangement of same two-dimensional antenna arrays. Correspondingly, $PS_1$, $PS_2$, $PS_3$, $PS_4$, $PS_5$, $PS_6$, $PS_7$, and $PS_5$ of an 8-input-2-output unit in a $j^{th}$ row and an $i^{th}$ column are $PS_1=-2(i-1)PD_{1\_column}-(j-1)PD_{1\_row}$, $PS_2=-2(i-1)PD_{2\_column}-(j-1)PD_{2\_row}$, $PS_3=-2(i-1)PD_{3\_column}-(j-1)PD_{3\_row}$, $PS_4=-2(i-1)PD_{4\_column}-(j-1)PD_{4\_row}$, $PS_5=-2(i-1)PD_{5\_column}-(j-1)PD_{5\_row}$, $PS_6=-2(i-1)PD_{6\_column}-(j-1)PD_{6\_row}$, $PS_7=-2(i-1)PD_{7\_column}-(j-1)PD_{7\_row}$, and $PS_8=-2(i-1)PD_{8\_column}-(j-1)PD_{8\_row}$ respectively. $PD_{1\_column}$ and $PD_{1\_row}$ are respectively a phase difference in input signals between adjacent columns and a phase difference in input signals between adjacent rows that are required by a radiation beam 1 of an antenna array shown in FIG. 6b. $PD_{2\_column}$ and $PD_{2\_row}$ are respectively a phase difference in input signals between adjacent columns and a phase difference in input signals between adjacent rows that are required by a radiation beam 2 of an antenna array shown in FIG. 6b. $PD_{3\_column}$ and $PD_{3\_row}$ are respectively a phase difference in input signals between adjacent columns and a phase difference in input signals between adjacent rows that are required by a radiation beam 3 of an antenna array shown in FIG. 6b. $PD_{4\_column}$ and $PD_{4\_row}$ are respectively a phase difference in input signals between adjacent columns and a phase difference in input signals between adjacent rows that are required by a radiation beam 4 of an antenna array shown in FIG. 6b. $PD_{5\_column}$ and $PD_{5\_row}$ are respectively a phase difference in input signals between adjacent columns and a phase difference in input signals between adjacent rows that are required by a radiation beam 5 of an antenna array shown in FIG. 6b. $PD_{6\_column}$ and $PD_{6\_row}$ are respectively a phase difference in input signals between adjacent columns and a phase difference in input signals between adjacent rows that are required by a radiation beam 6 of an antenna array shown in FIG. 6b. $PD_{7\_column}$ and $PD_{7\_row}$ are respectively a phase difference in input signals between adjacent columns and a phase difference in input signals between adjacent rows that are required by a radiation beam 7 of an antenna array shown in FIG. 6b. $PD_{8\_column}$ and $PD_{8\_row}$ are respectively a phase difference in input signals between adjacent columns and a phase difference in input signals between adjacent rows that are required by a radiation beam 8 of an antenna array shown in FIG. 6b.

Figure 7A:
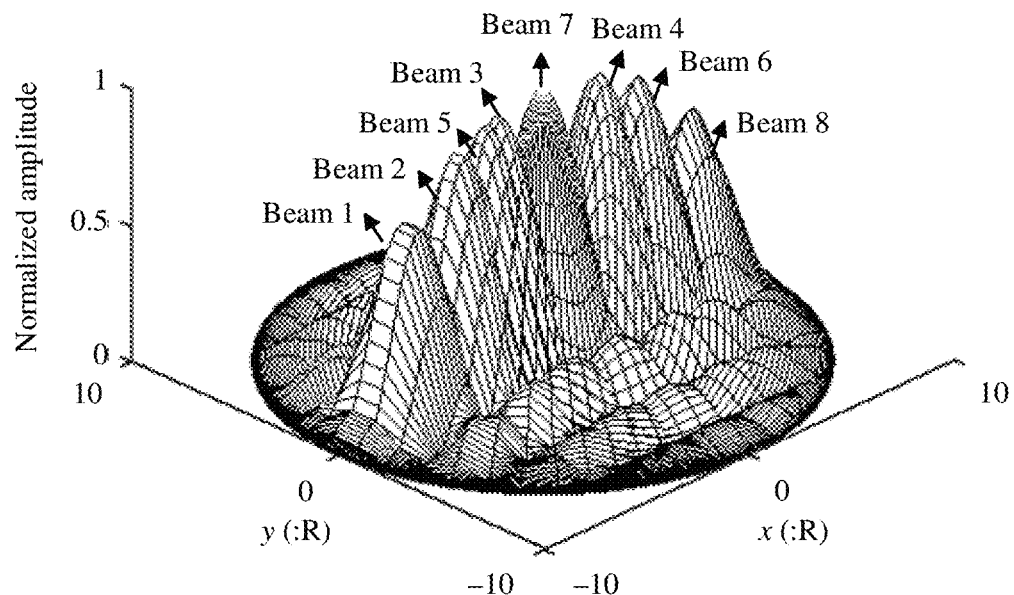
FIG. 7a is a schematic diagram of a simulation result according to at least an embodiment of this application.
Figure 7B:
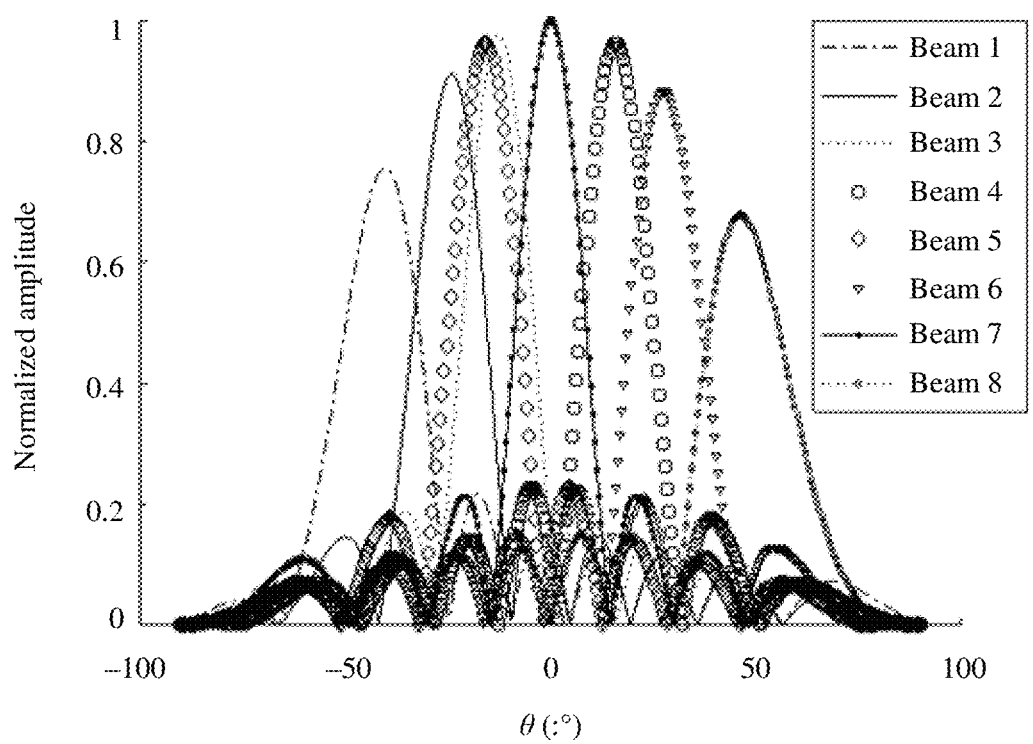
FIG. 7b is a schematic diagram of a simulation result according to at least an embodiment of this application.

In this application, the communication apparatus shown in FIG. 6b may generate, by connecting to 8×8 two-dimensional antenna arrays, eight beams that can be independently adjusted. When array elements in the array are evenly distributed, a spacing is a half wavelength, main lobes of a beam 1 to a beam 8 are all on a plane of φ=0° (φ is an azimuth of a spherical coordinate), and it is assumed that when direction angles of required beams are $θ_1=-40°$, $θ_2=-24°$, $θ_3=-13°$, $θ_4=16°$, $θ_5=-16°$, $θ_6=27°$, $θ_7=0°$, and $θ_8=46°$ (θ is a pitch angle of a spherical coordinate) respectively, a phase difference between adjacent output ports that are in each row of the communication apparatus and that are required by each beam is 0°, and a phase difference between adjacent output ports in each column is shown in Table 1. In addition, phase difference values of each 8-input-2-output coupler with an adjustable phase difference and phase shift values of four phase shifters are $x_1=-22.5°$, $x_2=-45°$, $x_3=-67.5°$, $x_4=-67.5°$, $PS_{10}=-102.5°$, $PS_9=97.5°$, $PS_{12}=-50°$, and $PS_{13}=-17.5°$ respectively. $PS_1$, $PS_2$, $PS_3$, $PS_4$, $PS_5$, $PS_6$, $PS_7$, and $PS_8$ in $j^{th}$ row and an $i^{th}$ column of an 8-input-2-output communication apparatus are $PS_1=-240(i-1)$, $PS_2=-150(i-1)$, $PS_3=-80(i-1)$, $PS_4=100(i-1)$, $PS_5=-100(i-1)$, $PS_6=170(i-1)$, $PS_7=0$, and $PS_8=270(i-1)$ respectively. When the phase difference values of the phase difference couplers and the phase shift values of the phase shifters of the communication apparatus are set based on the foregoing data, distribution of eight beams generated by the corresponding 8×8 two-dimensional antenna arrays is shown in FIG. 7a. FIG. 7b is a beam distribution diagram in a φ=0° plane. In FIG. 7a, there are eight wave peaks. That is, correspondingly, the eight beams in FIG. 7b are a beam 1, a beam 2, a beam 3, a beam 4, a beam 5, a beam 6, a beam 7, and a beam 8 respectively.

TABLE 1

Correspondences between beam directions and phase differences between adjacent output ports of a feed network (in a φ = 0° plane)

| Beam ID | 1 | 2 | 3 | 4 | 5 | 6 | 7 | 8 |
|---|---|---|---|---|---|---|---|---|
| Beam direction θ (:°) | −40 | −24 | −13 | 16 | −16 | 27 | 0 | 46 |
| Phase difference between adjacent ports in each column (:°) | 120 | 75 | 40 | −50 | 50 | −85 | 0 | −135 |

Figure 8A:
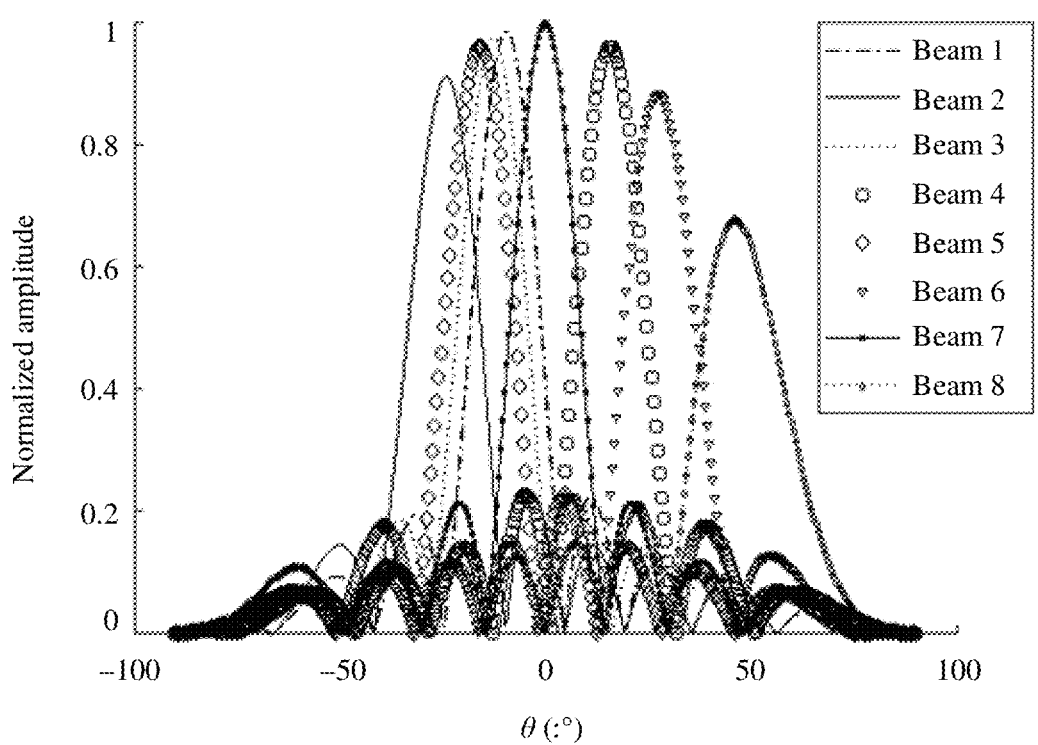
FIG. 8a is a schematic diagram of a simulation result according to at least an embodiment of this application.
Figure 8B:
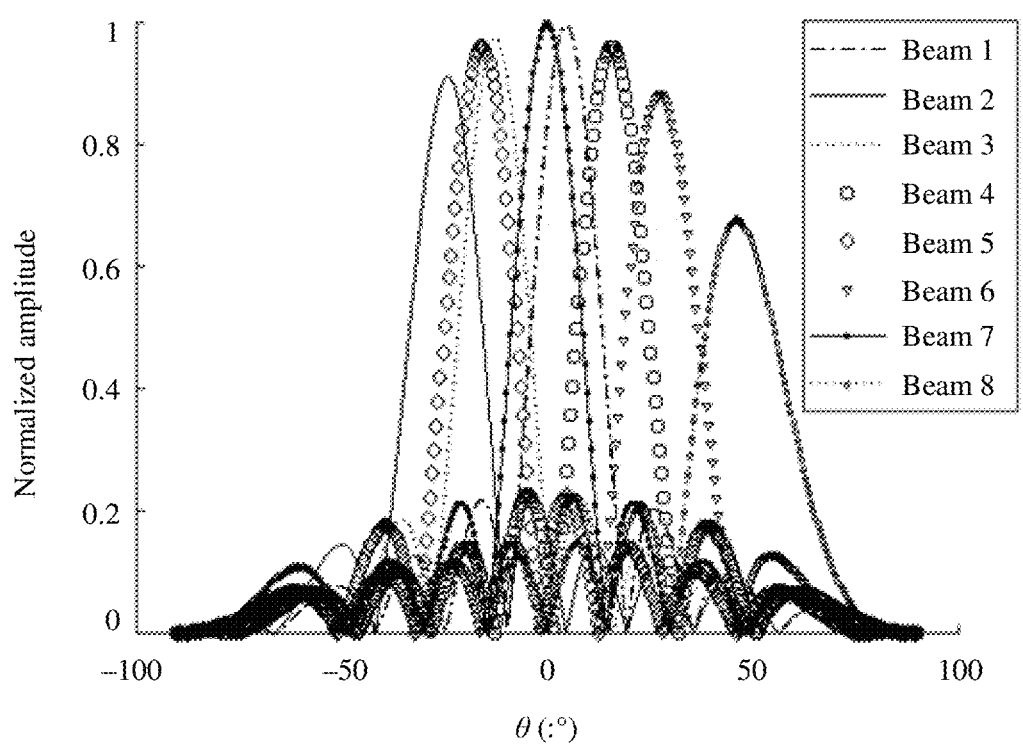
FIG. 8b is a schematic diagram of a simulation result according to at least an embodiment of this application.
Figure 8C:
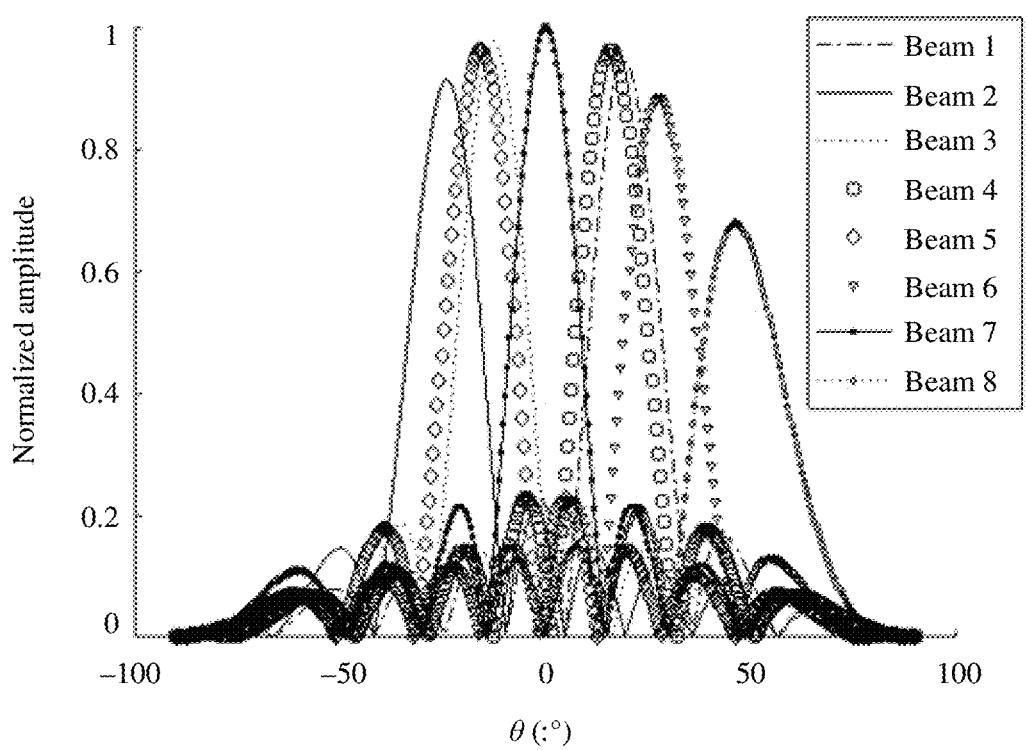
FIG. 8c is a schematic diagram of a simulation result according to at least an embodiment of this application.
Figure 8D:
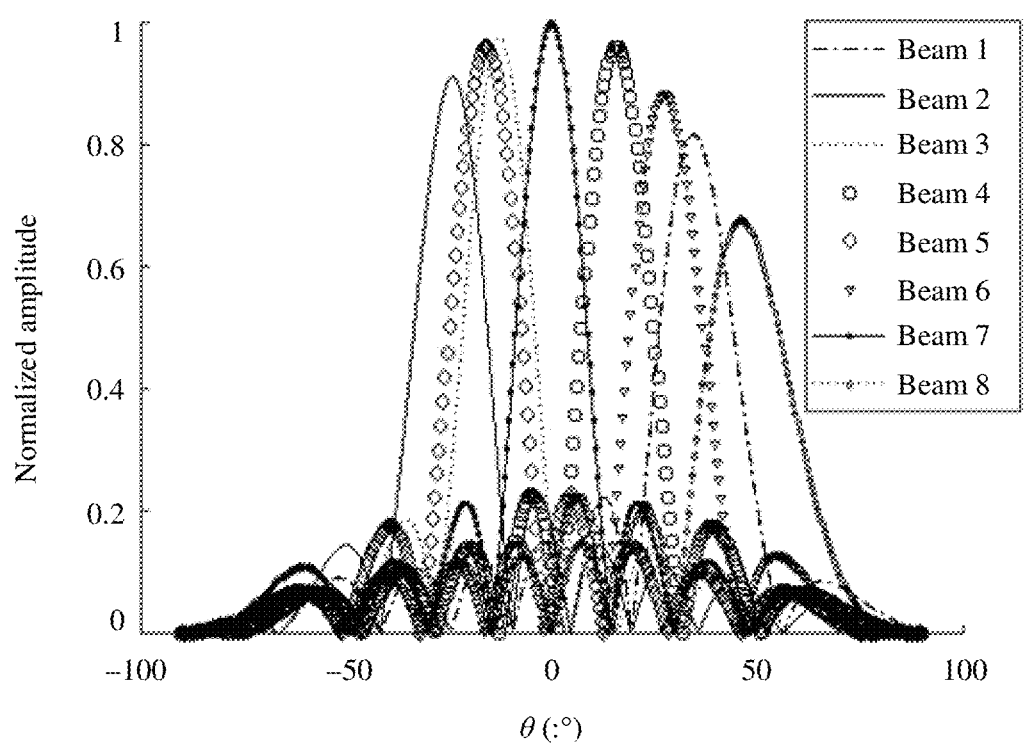
FIG. 8d is a schematic diagram of a simulation result according to at least an embodiment of this application.

The communication apparatus may independently adjust a direction of each beam. The beam 1 is used as an example. FIG. 8a to FIG. 8d show that the beam 1 implements independent scanning in an x direction without affecting other seven beams. An initial state of the beam 1 is shown in FIG. 7b, and a beam direction (θ, φ)=(−40, 0)°. As shown in Table 2, when a phase difference $x_1$ of a phase difference coupler and phase shift values $PS_{10}$ and $PS_{11}$ of phase shifters are adjusted simultaneously, the beam 1 may independently scan to (θ, φ)=(−9, 0) ° as shown in FIG. 8a, (θ, φ)=(5, 0) ° as shown in FIG. 8b, (θ, φ)=(19, 0) ° as shown in FIG. 8c, and (θ, φ)=(35, 0) ° as shown in FIG. 8d.

TABLE 2

Corresponding phase differences of phase difference couplers and phase shift values of phase shifters scanned by the beam 1 shown in FIG. 8a to FIG. 8d

| Beam direction (θ, φ) (:°) | (−40, 0) | (−9, 0) | (5,0) | (19, 0) | (35, 0) |
|---|---|---|---|---|---|
| $x_1$ (:°) | −22.5 | 22.5 | 45 | 67.5 | 90 |
| $PS_5$ (:°) | −102.5 | −57.5 | −35 | −12.5 | 10 |
| $PS_6$ (:°) | 97.5 | 52.5 | 30 | 7.5 | −15 |

Figure 9A:
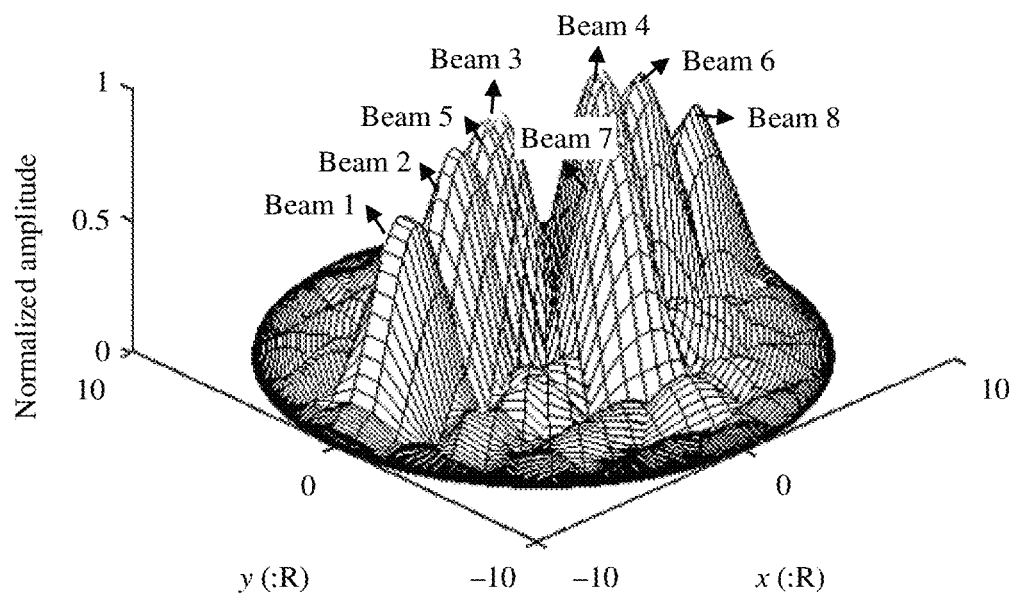
FIG. 9a is a schematic diagram of a simulation result according to at least an embodiment of this application.
Figure 9B:
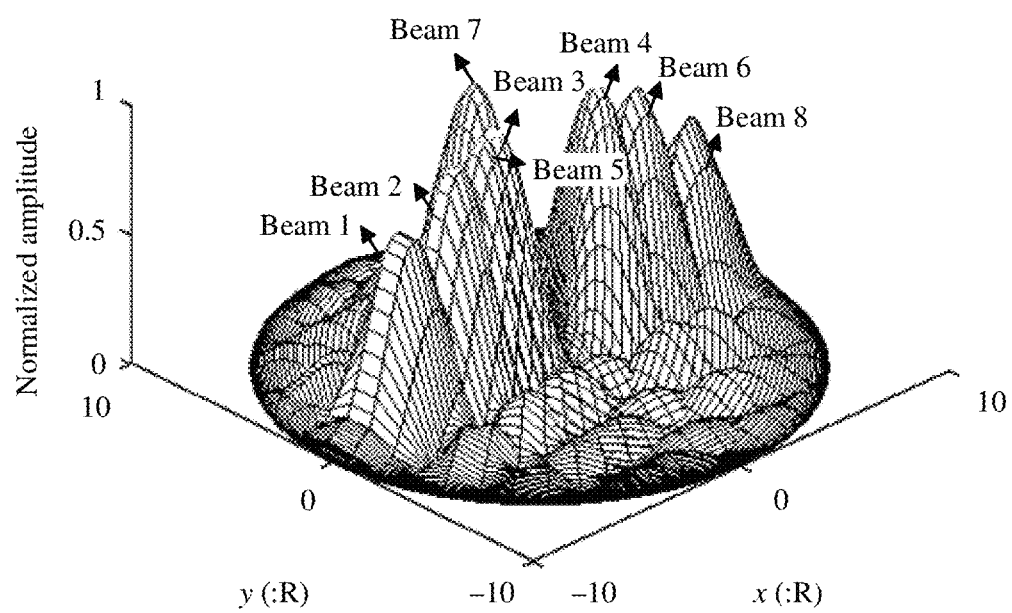
FIG. 9b is a schematic diagram of a simulation result according to at least an embodiment of this application.

In addition, FIG. 9a and FIG. 9b show schematic diagrams of independent scanning by the beam 7 in a y direction. A direction angle of the beam 7 is adjusted from an initial location (θ, φ)=(0, 0) ° shown in FIG. 7a to (θ, φ)=(19, 270) ° as shown in FIG. 9a, or to (θ, φ)=(19, 90) ° as shown in FIG. 9b. The scanning is implemented by adjusting a phase shift value of a phase shifter 7 of an 8-input-2-output unit in a $j^{th}$ row in FIG. 6b to $PS_7=-60(j-1)°$ and $PS_7=60(j-1)°$.

Figures 1, 10A:
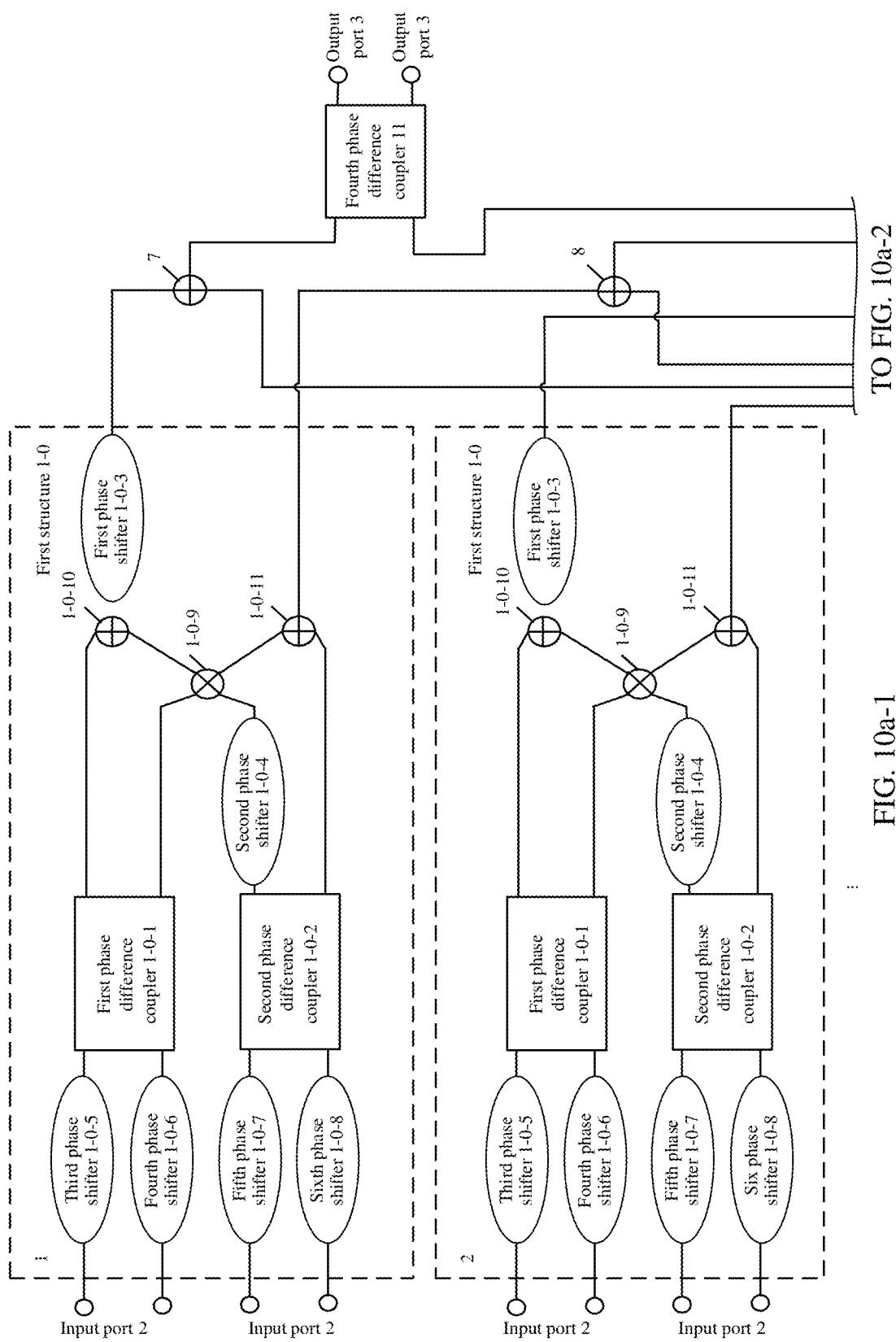
Figures 2, 10A:
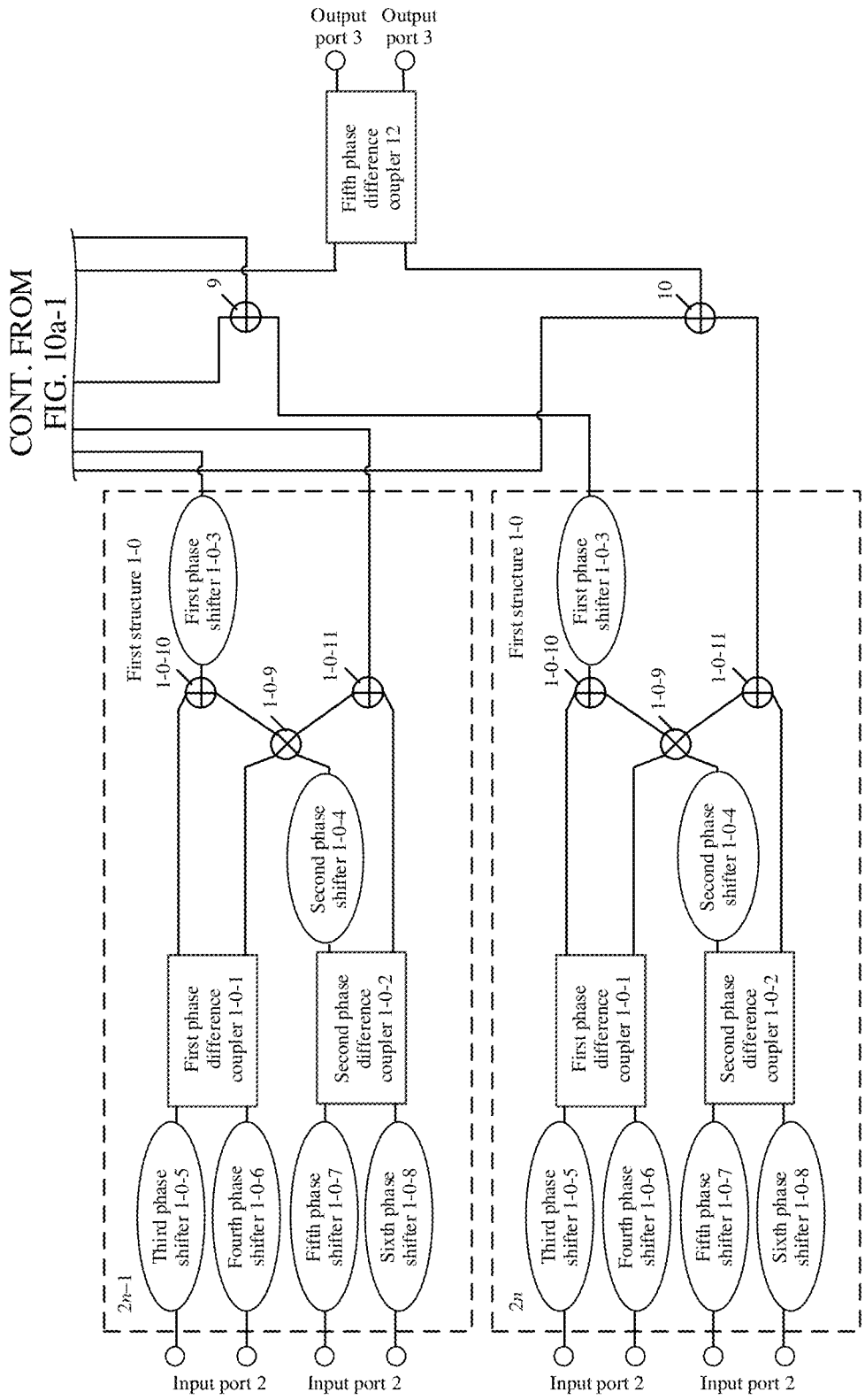

In this application, a fifth combiner 7, a sixth combiner 8, a seventh combiner 9, an eighth combiner 10, a fourth phase difference coupler 11, and a fifth phase difference coupler 12 are further introduced to further reduce a quantity of phase shifters required by the communication apparatus, as shown in FIG. 10a-1 and FIG. 10a-2. When the phase shift unit 1 includes a plurality of first structures 1-0, the fifth combiner 7 may combine a signal from an output port of the first phase shifter 1-0-3 in an odd-numbered first structure 1-0, and an output port of the fifth combiner 7 is coupled to a first input port of the fourth phase difference coupler 11; the sixth combiner 8 may combine a signal from an output port of the second combiner 1-0-11 in an odd-numbered first structure 1-0, and an output port of the sixth combiner 8 is coupled to a first input port of the fifth phase difference coupler 12; the seventh combiner 9 may combine a signal from an output port of the first phase shifters 1-0-3 in an even-numbered first structure 1-0, and an output port of the seventh combiner 9 is coupled to a second input port of the fourth phase difference coupler 11; and the eighth combiner 10 may combine a signal from an output port of the second combiner 1-0-11 in an even-numbered first structure 1-0, and an output port of the eighth combiner 10 is coupled to a second input port of the fifth phase difference coupler 12.

Figures 1, 10B:
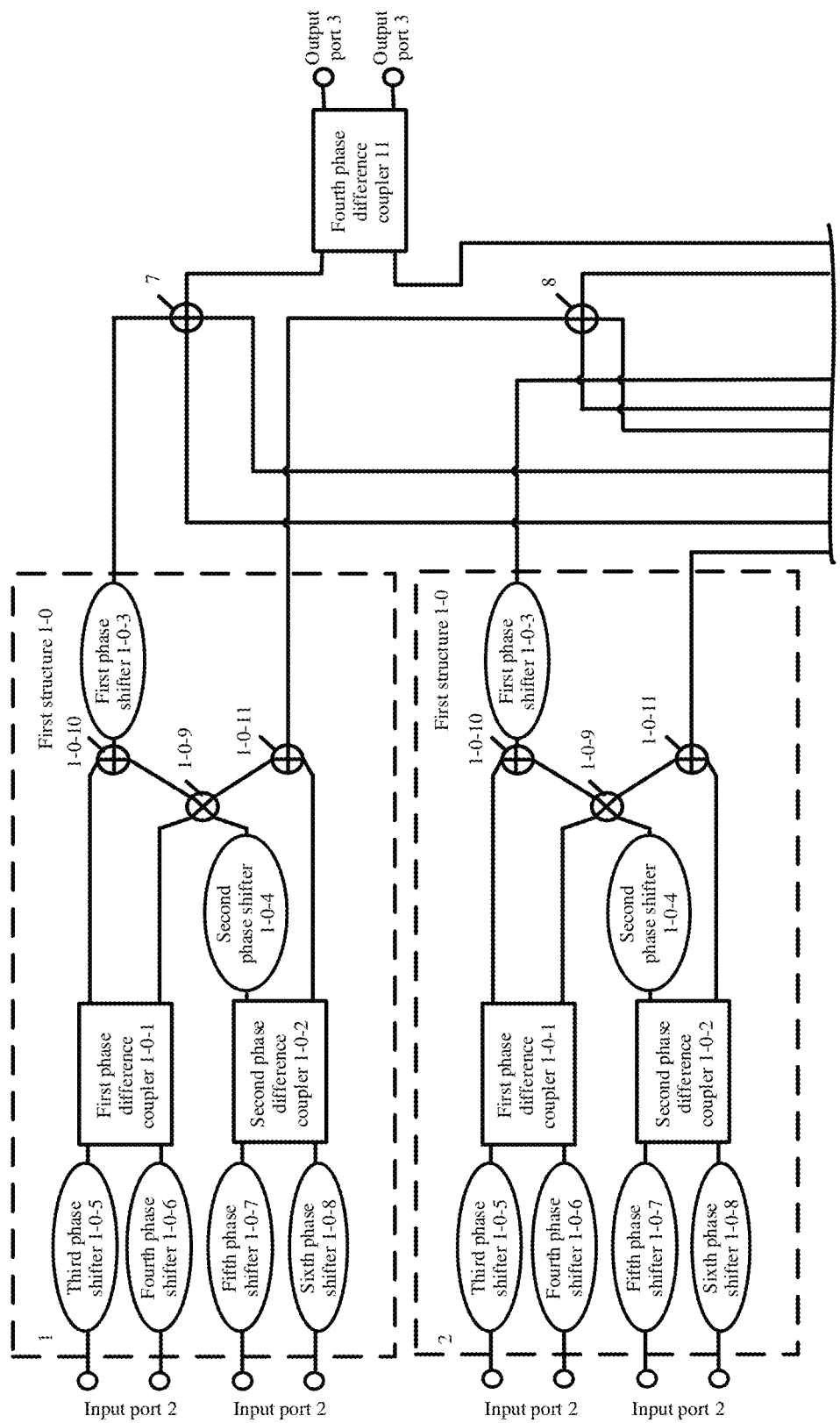
Figures 2, 10B:
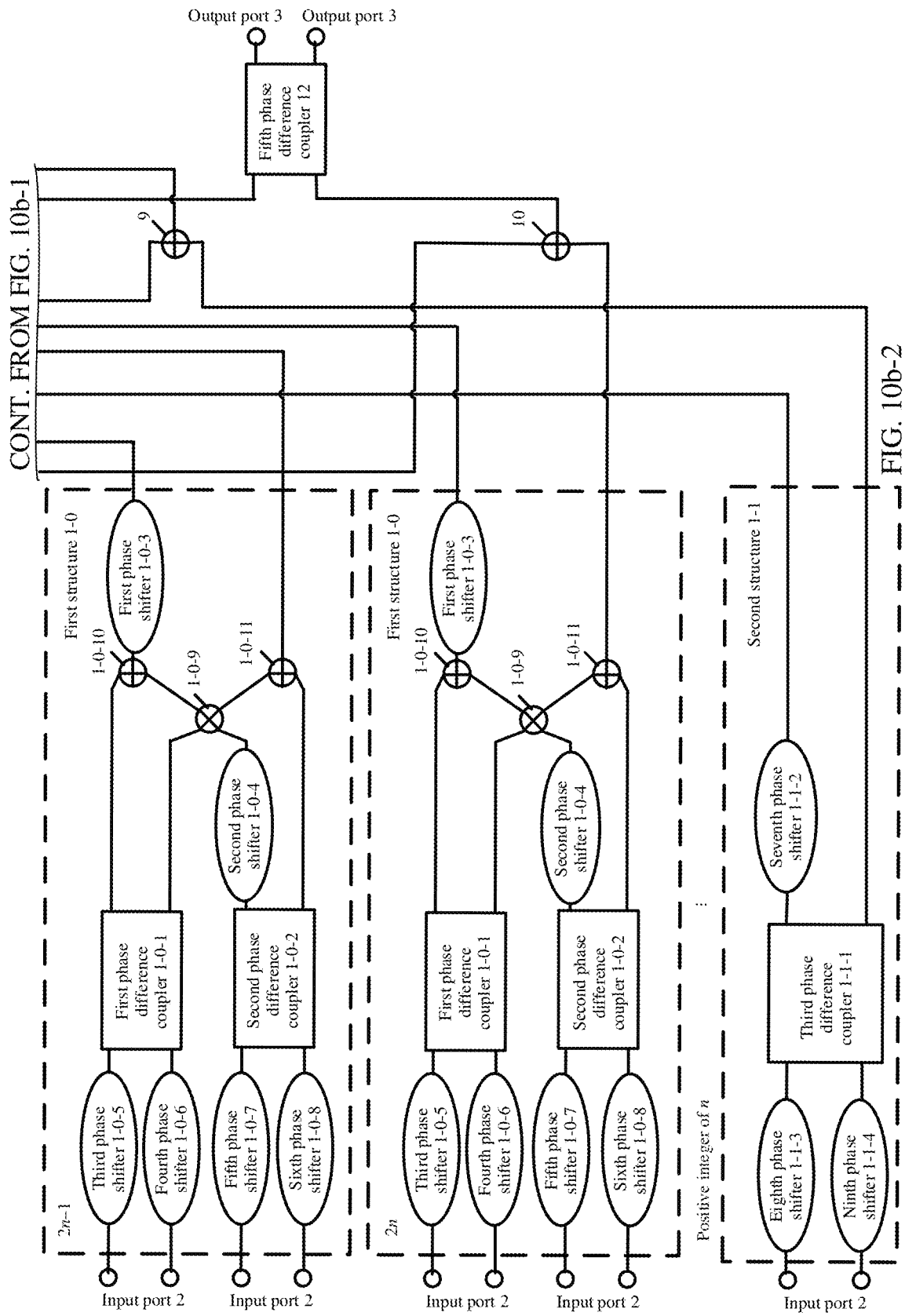

As shown in FIG. 10b-1 and FIG. 10b-2, when the phase shift unit 1 includes a plurality of first structures 1-0 and one second structure 1-1, the fifth combiner 7 may combine a signal from an output port of the first phase shifter 1-0-3 in an odd-numbered first structure 1-0 and a signal from an output port of the seventh phase shifter 1-1-2 in the second structure 1-1, and the output port of the fifth combiner 7 is coupled to the first input port of the fourth phase difference coupler 11; the sixth combiner 8 may combine a signal from an output port of the second combiner 1-0-11 in an odd-numbered first structure 1-0 and a signal from a second output port of the third phase difference coupler 1-1-1 in the second structure 1-1, and the output port of the sixth combiner 8 is coupled to the first input port of the fifth phase difference coupler 12; the seventh combiner 9 may combine a signal from an output port of the first phase shifter 1-0-3 in an even-numbered first structure 1-0, and the output port of the seventh combiner 9 is coupled to the second input port of the fourth phase difference coupler 11; and the eighth combiner 10 may combine a signal from an output port of the second combiner 1-0-11 in an even-numbered first structure 1-0, and the output port of the eighth combiner 10 is coupled to the second input port of the fifth phase difference coupler 12.

Figures 1, 10C:
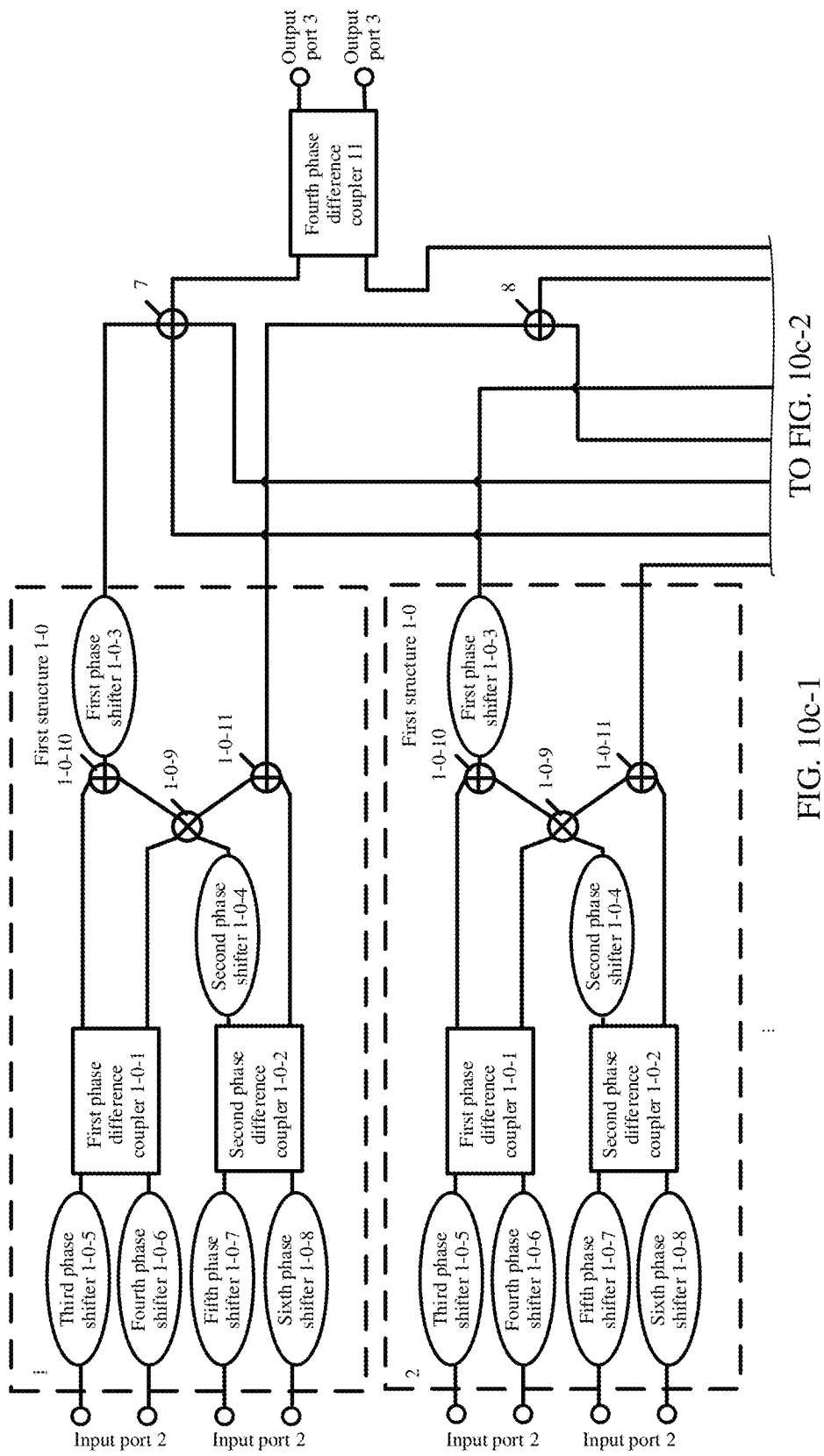
Figures 2, 10C:
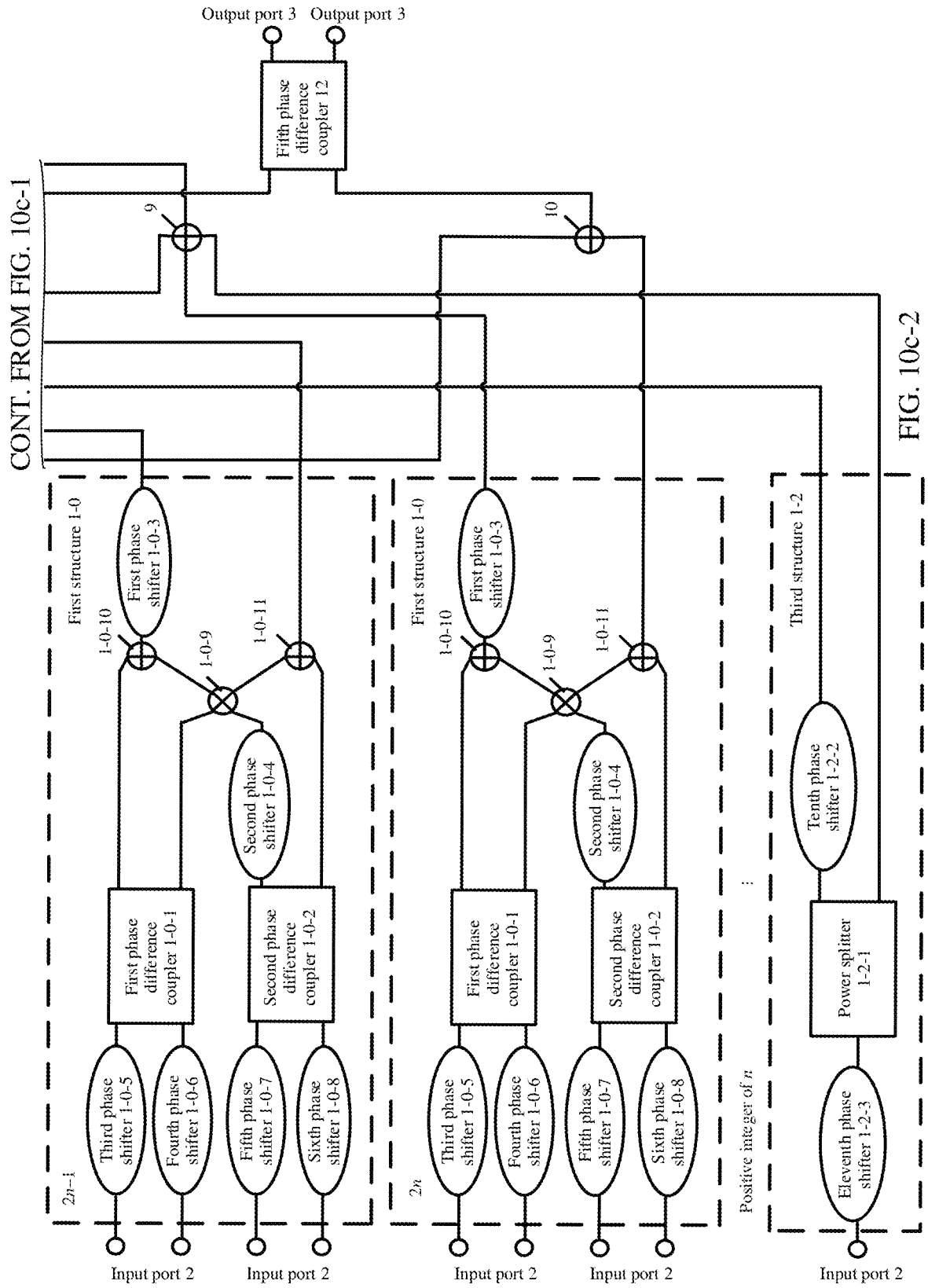

As shown in FIG. 10c-1 and FIG. 10c-2, when the phase shift unit 1 includes a plurality of first structures 1-0 and one third structure 1-2, the fifth combiner 7 may combine a signal from an output port of the first phase shifter 1-0-3 in an odd-numbered first structure 1-0 and a signal from an output port of the tenth phase shifter 1-2-2 in the third structure 1-2, and the output port of the fifth combiner 7 is coupled to the first input port of the fourth phase difference coupler 11; the sixth combiner 8 may combine signals from output ports of the second combiner 1-0-11 in an odd-numbered first structures 1-0, and the output port of the sixth combiner 8 is coupled to the first input port of the fifth phase difference coupler 12; the seventh combiner 9 may combine a signal from an output port of the first phase shifter 1-0-3 in an even-numbered first structure 1-0, and the output port of the seventh combiner 9 is coupled to the second input port of the fourth phase difference coupler 11; and the eighth combiner 10 may combine a signal from an output port of the second combiner 1-0-11 in an even-numbered first structure 1-0, and the output port of the eighth combiner 10 is coupled to the second input port of the fifth phase difference coupler 12.

It should be noted that, if the phase shift unit 1 includes a plurality of first structures 1-0 that are sorted in turn, for example, 10 first structures 1-0, the foregoing odd-numbered may be understood as a first, third, fifth, seventh, and ninth, and the foregoing even-numbered may be understood as a second, a fourth, a sixth, an eighth, and a tenth.

In this application, the fourth phase difference coupler 11 and the fifth phase difference coupler 12 are introduced to increase a quantity of output ports of the communication apparatus, so that a quantity of phase shifters in the communication apparatus can be further reduced.

Figure 11A:
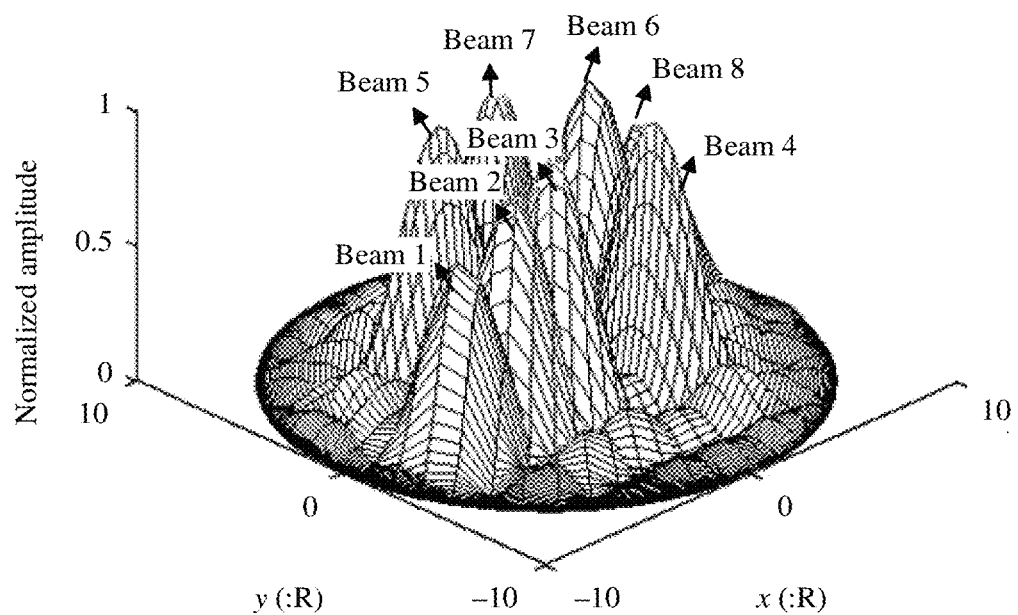
FIG. 11a is a schematic diagram of a simulation result according to at least an embodiment of this application.
Figure 11B:
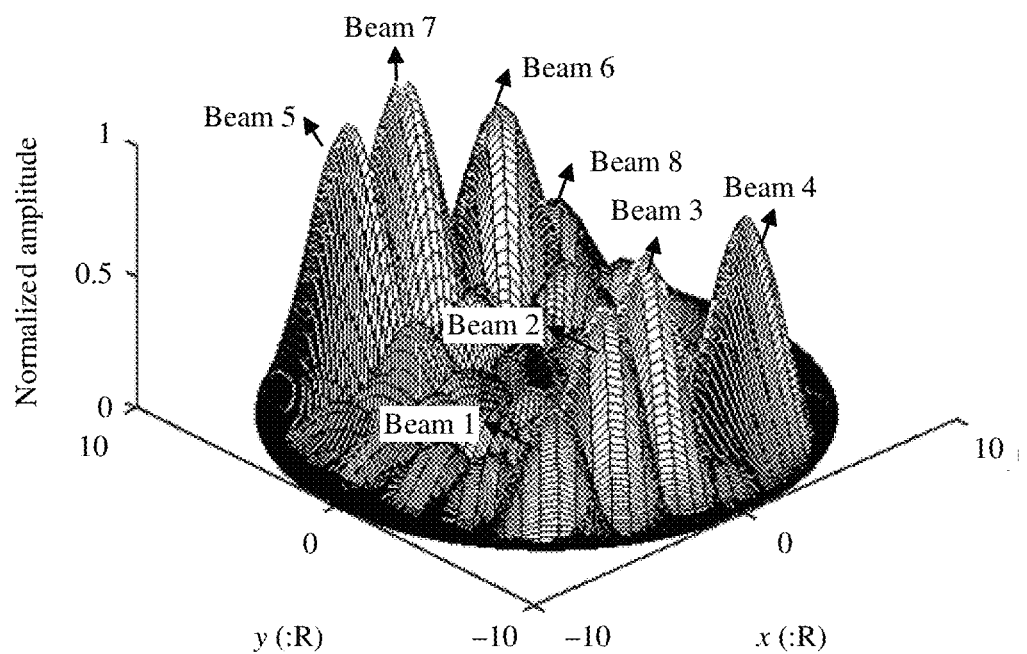
FIG. 11b is a schematic diagram of a simulation result according to at least an embodiment of this application.

When a phase difference value of the fourth phase difference coupler 11 is $x_4=0$, and a phase difference value of the fifth phase difference coupler 12 is $x_5=0$, phase difference values of phase difference couplers and phase shift values of phase shifters in an 8-input-2-output unit may be set based on phase difference values of phase difference couplers and phase shift values of phase shifters corresponding to the beams in FIG. 7*a*, and eight beams in spatial distribution may be obtained. Scanning by the eight beams in an x direction is completely the same as that of FIG. 7*a*, that is, the eight beams may perform scanning independently and freely in the x direction. However, the eight beams perform scanning independently in two groups in a y direction. Beams 1 to 4 form a group, and beams 5 to 8 form a group. In addition, scanning by the beams in the y direction is implemented by adjusting values of the phase difference couplers $x_4$ and $x_5$. FIG. 11*a* and FIG. 11*b* respectively correspond to different angles scanned, when $x_4=x_5=-45°$ and $x_4=x_5=-135°$ and in different phase difference values, by beams corresponding to each group in the y direction.

In addition, in actual application, when the fifth combiner 7, the sixth combiner 8, the seventh combiner 9, and the eighth combiner 10 combine signals in the phase shift unit 1, a signal combination manner is not limited to the foregoing signal combination manner. Another signal combination manner may be further included. This is not specifically limited herein in this application. For example, when the phase shift unit 1 includes 2n first structures 1-0, the fifth combiner 7 may combine signals from output ports of first phase shifters 1-0-3 of a first first structure to an $n^{th}$ first structure, the sixth combiner 8 may combine signals from output ports of second combiners 1-0-11 of a first first structure to an $n^{th}$ first structure 1-0, the seventh combiner 9 may combine signals from output ports of first phase shifters 1-0-3 of an $n+1^{th}$ first structure to a $2n^{th}$ first structure 1-0, and the eighth combiner 10 may combine signals from output ports of second combiners 1-0-11 of an $n+1^{th}$ first structure to a $2n^{th}$ first structure 1-0. n is an integer, and n is greater than or equal to 0. Any manner in which output signals of the phase shift unit 1 are combined by using the fifth combiner 7, the sixth combiner 8, the seventh combiner 9, and the eighth combiner 10 is applicable to this application.

Figure 12:
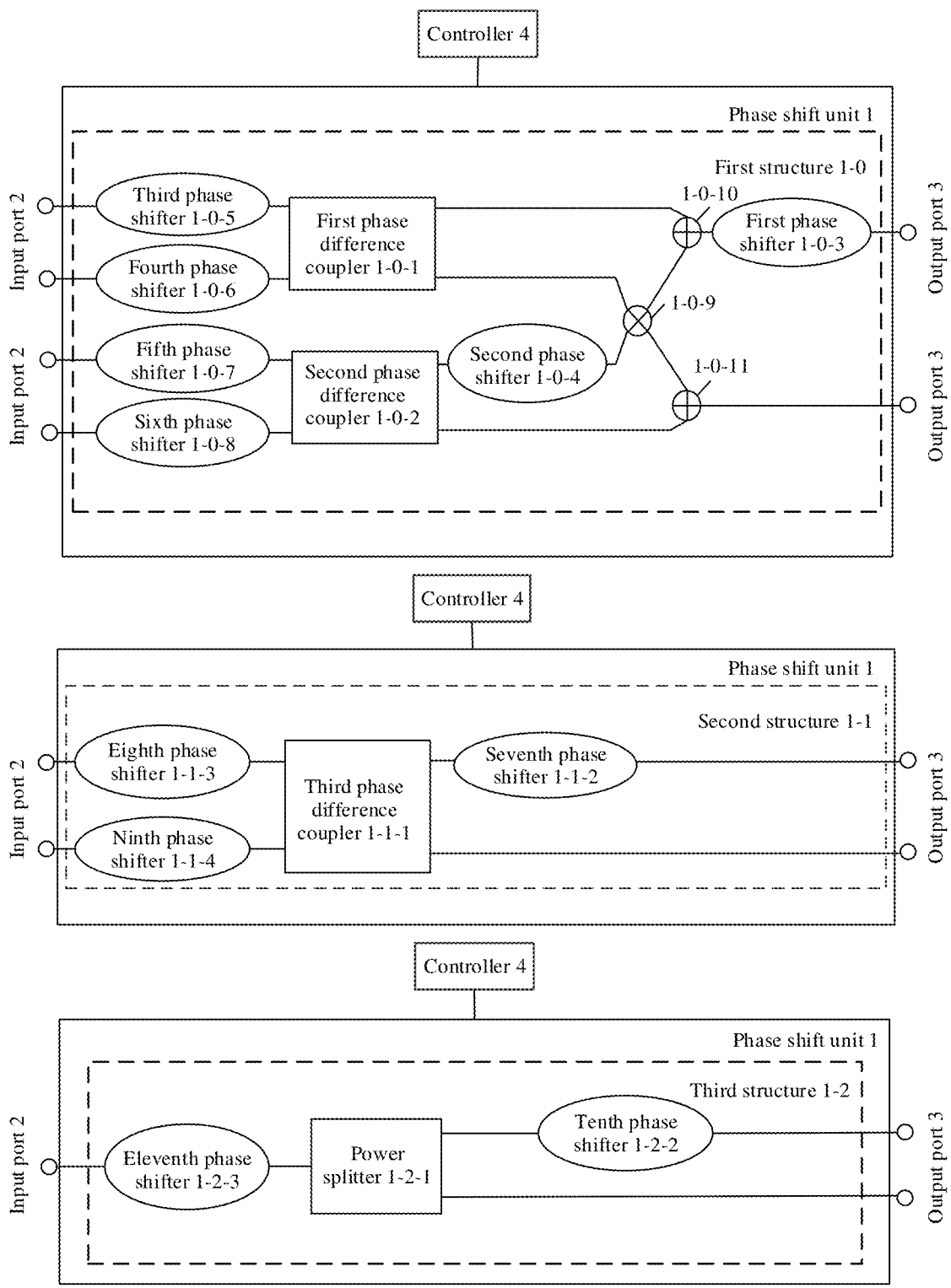
FIG. 12 is a schematic diagram of another structure of a communication apparatus according to at least an embodiment of this application.

For example, the communication apparatus may further include a controller 4, as shown in FIG. 12. The controller 4 is coupled to the phase shift unit 1. The controller 4 may determine, in the foregoing manner, phase shift values of phase shifters and phase difference values of phase difference couplers in the communication apparatus, and adjust a parameter of the phase shift unit 1 based on the determined phase shift values and phase difference values. The parameter includes but is not limited to a parameter of at least one of the following: a parameter of the first phase difference coupler 1-0-1, a parameter of the second phase difference coupler 1-0-2, a parameter of the third phase difference coupler 1-1-1, a parameter of the first phase shifter 1-0-3, a parameter of the second phase shifter 1-0-4, a parameter of the third phase shifter 1-0-5, a parameter of the fourth phase shifter 1-0-6, a parameter of the fifth phase shifter 1-0-7, a parameter of the sixth phase shifter 1-0-8, a parameter of the seventh phase shifter 1-1-2, a parameter of the eighth phase shifter 1-1-3, a parameter of the ninth phase shifter 1-1-4, a parameter of the tenth phase shifter 1-2-2, and a parameter of the eleventh phase shifter 1-2-3. In actual application, the controller 4 may be implemented by using a field programmable gate array (field programmable gate array, FPGA) or a digital signal processing (digital signal processing, DSP) chip, or may be implemented in another hardware manner or software manner. This is not specifically limited herein in this application.

Figure 13:
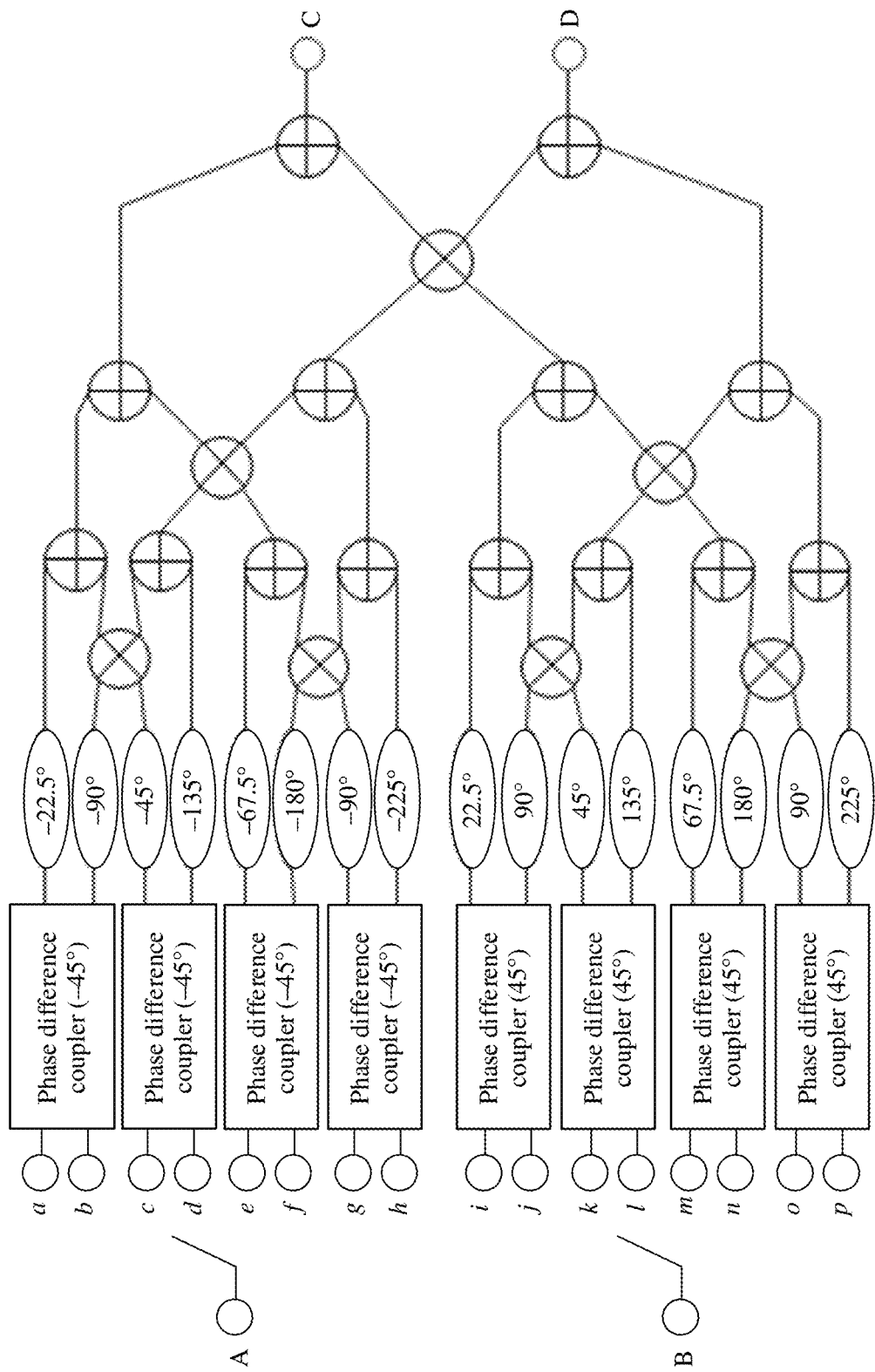
FIG. 13 is a schematic diagram of a structure of a phase difference coupler with an adjustable phase difference according to at least an embodiment of this application.

In addition, it should be noted that the phase difference coupler in this application may implement a phase difference coupler with an adjustable phase difference by using a single-pole multi-throw switch, a phase difference coupler with a fixed phase difference, and a phase shifter with a fixed phase shift value. FIG. 13 shows a specific structure of a phase difference coupler with an adjustable phase difference. An adjustment range of the phase difference value of the phase difference coupler having the structure is from 0° to 180° (including 0° and 180°), and an adjustment step is 22.5°. As shown in FIG. 13, the structure includes two single-pole eight-throw switches A and B, four 3 dB phase difference couplers with a phase difference of −45°, four 3 dB phase difference couplers with a phase difference of 45°, 16 fixed phase shifters, an output port C, and an output port D. Distribution of phase shift values of the phase shifters is also shown in FIG. 13. In this structure, phase difference couplers with different phase difference values are implemented by selecting different input ports through the switches. Correspondences of phase differences between input ports and output ports are shown in Table 3. In actual application, only some rows or columns in Table 3 may be applied, which is not specifically limited herein. For example, if a single-pole multi-throw switch A is connected to an input port b, and a single-pole multi-throw switch B is connected to an input port j, a phase difference value of an adjustable phase difference coupler determined through the structure is −22.5. If the single-pole multi-throw switch A is connected to an input port d, and the single-pole multi-throw switch B is connected to an input port l, a phase difference value of an adjustable phase difference coupler determined through the structure is −45.

TABLE 3

Correspondences of phase differences between input ports and output ports of adjustable phase difference couplers shown in FIG. 13

| Phase difference of a phase difference coupler (:°) | Connected port number | | Phase difference between an output port C and an output port D (:°) |
|---|---|---|---|
| −22.5 | Input port A | b | −22.5 |
|  | Input port B | j | 22.5 |
| −45 | Input port A | d | −45 |
|  | Input port B | l | 45 |
| −67.5 | Input port A | f | −67.5 |
|  | Input port B | n | 67.5 |

TABLE 3-continued

Correspondences of phase differences between input ports and output ports of adjustable phase difference couplers shown in FIG. 13

| Phase difference of a phase difference coupler (:°) | Connected port number | | Phase difference between an output port C and an output port D (:°) |
|---|---|---|---|
| −90 | Input port A | h | −90 |
| | Input port B | p | 90 |
| −112.5 | Input port A | a | −112.5 |
| | Input port B | i | 112.5 |
| −135 | Input port A | b | −135 |
| | Input port B | k | 135 |
| −157.5 | Input port A | c | −157.5 |
| | Input port B | m | 157.5 |
| −180 | Input port A | e | −180 |
| | Input port B | o | 180 |

According to embodiments of this application, when beamforming is performed by using the communication apparatus, the phase difference coupler with the adjustable phase difference is introduced, so that a quantity of phase shifters required during beamforming can be reduced. Signals in different channels may share the first phase shifter 1-0-3 and the second phase shifter 1-0-4. In a case of phase shifter multiplexing, the quantity of the phase shifters can also be reduced, device overheads during beamforming can be reduced, and power consumption of the device can be further reduced. In addition, a phase difference value of the phase difference coupler and a phase shift value of the phase shifter are adjusted, so that a plurality of beams can be flexibly adjusted and controlled, and independent scanning by each beam can be implemented.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

The computer program instructions may alternatively be stored in a computer-readable memory that can indicate a computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communication apparatus, comprising a phase shifter, an input port, and an output port, wherein
   the phase shifter comprises at least one first structure; the first structure comprises a first phase difference coupler, a second phase difference coupler, a first phase shifter, a second phase shifter, a third phase shifter, a fourth phase shifter, a fifth phase shifter, a sixth phase shifter, a cross coupler, a first combiner, and a second combiner;
   the first phase difference coupler is coupled to the third phase shifter and the fourth phase shifter, and the first phase difference coupler is further coupled to the cross coupler and the first combiner; and the second phase difference coupler is coupled to the fifth phase shifter and the sixth phase shifter, and the second phase difference coupler is further coupled to the second phase shifter and the second combiner, wherein a second output port of the first phase difference coupler is coupled to a first input port of the cross coupler, a first output port of the second phase difference coupler is coupled to an input port of the second phase shifter, and an output port of the second phase shifter is coupled to a second input port of the cross coupler; and
   the input port is coupled to an input port of the third phase shifter, an input port of the fourth phase shifter, an input port of the fifth phase shifter, and an input port of the sixth phase shifter; and
   the output port is coupled to an output port of the first phase shifter and an output port of the second combiner.

2. The apparatus according to claim 1, wherein the phase shifter further comprises a second structure;
   the second structure comprises a third phase difference coupler, a seventh phase shifter, an eighth phase shifter, and a ninth phase shifter;
   the third phase difference coupler is coupled to the eighth phase shifter and the ninth phase shifter, and the third phase difference coupler is further coupled to the seventh phase shifter; and
   the input port is further coupled to an input port of the eighth phase shifter and an input port of the ninth phase shifter, and
   the output port is further coupled to an output port of the seventh phase shifter and the third phase difference coupler.

3. The apparatus according to claim 1, wherein the phase shifter further comprises a third structure;

the third structure comprises a power splitter, a tenth phase shifter, and an eleventh phase shifter;

the power splitter is further coupled to the tenth phase shifter and the eleventh phase shifter;

the input port is further coupled to an input port of the eleventh phase shifter, and the output port is further coupled to an output port of the tenth phase shifter and the power splitter.

4. The apparatus according to claim 1, wherein the input port of the apparatus is coupled to a power splitter.

5. The apparatus according to claim 1, further comprising a controller, wherein the controller is configured to adjust a parameter of the phase shifter, and the parameter comprises at least one of:

a parameter of the first phase difference coupler, a parameter of the second phase difference coupler, a parameter of a third phase difference coupler, a parameter of the first phase shifter, a parameter of the second phase shifter, a parameter of the third phase shifter, a parameter of the fourth phase shifter, a parameter of the fifth phase shifter, a parameter of the sixth phase shifter, a parameter of a seventh phase shifter, a parameter of an eighth phase shifter, a parameter of a ninth phase shifter, a parameter of a tenth phase shifter, or a parameter of an eleventh phase shifter.

6. A communication system, comprising an antenna array and a communication apparatus, wherein the communication apparatus comprises a phase shifter, an input port, and an output port, wherein the phase shifter comprises at least one first structure; the first structure comprises a first phase difference coupler, a second phase difference coupler, a first phase shifter, a second phase shifter, a third phase shifter, a fourth phase shifter, a fifth phase shifter, a sixth phase shifter, a cross coupler, a first combiner, and a second combiner;

the first phase difference coupler is coupled to the third phase shifter and the fourth phase shifter, and the first phase difference coupler is further coupled to the cross coupler and the first combiner; and the second phase difference coupler is coupled to the fifth phase shifter and the sixth phase shifter, and the second phase difference coupler is further coupled to the second phase shifter and the second combiner, wherein a second output port of the first phase difference coupler is coupled to a first input port of the cross coupler, a first output port of the second phase difference coupler is coupled to an input port of the second phase shifter, and an output port of the second phase shifter is coupled to a second input port of the cross coupler; and the input port is coupled to an input port of the third phase shifter, an input port of the fourth phase shifter, an input port of the fifth phase shifter, and an input port of the sixth phase shifter; and the output port is coupled to an output port of the first phase shifter and an output port of the second combiner; and wherein the antenna array is connected to an output port of the communication apparatus; and the antenna array is configured to output beams having different corresponding directions.

7. The system according to claim 6, further comprising a radio frequency circuit, wherein the radio frequency circuit is connected to an input port of the communication apparatus; and the radio frequency circuit is configured to input a signal to the communication apparatus.

8. The system according to claim 6, wherein the phase shifter further comprises a second structure;

the second structure comprises a third phase difference coupler, a seventh phase shifter, an eighth phase shifter, and a ninth phase shifter;

the third phase difference coupler is coupled to the eighth phase shifter and the ninth phase shifter, and the third phase difference coupler is further coupled to the seventh phase shifter;

the input port is further coupled to an input port of the eighth phase shifter and an input port of the ninth phase shifter, and the output port is further coupled to an output port of the seventh phase shifter and the third phase difference coupler.

9. The system according to claim 6, wherein the phase shifter further comprises a third structure;

the third structure comprises a power splitter, a tenth phase shifter, and an eleventh phase shifter;

the power splitter is further coupled to the tenth phase shifter and the eleventh phase shifter;

the input port is further coupled to an input port of the eleventh phase shifter, and the output port is further coupled to an output port of the tenth phase shifter and the power splitter.

10. The system according to claim 6, wherein the input port of the communication apparatus is coupled to a power splitter.

11. The system according to claim 6, the communication apparatus further comprising a controller, wherein the controller is configured to adjust a parameter of the phase shifter, and the parameter comprises at least one of:

a parameter of the first phase difference coupler, a parameter of the second phase difference coupler, a parameter of a third phase difference coupler, a parameter of the first phase shifter, a parameter of the second phase shifter, a parameter of the third phase shifter, a parameter of the fourth phase shifter, a parameter of the fifth phase shifter, a parameter of the sixth phase shifter, a parameter of a seventh phase shifter, a parameter of an eighth phase shifter, a parameter of a ninth phase shifter, a parameter of a tenth phase shifter, or a parameter of an eleventh phase shifter.

12. A method, comprising:

receiving a radio frequency signal; and sending the radio frequency signal to a communication apparatus according to claim 1, thereby configuring an antenna array to output beams having different directions.

* * * * *